US010557560B2

(12) United States Patent
Gandikota et al.

(10) Patent No.: US 10,557,560 B2
(45) Date of Patent: Feb. 11, 2020

(54) FLOW REGULATOR

(71) Applicant: FLUIDMASTER, INC., San Juan Capistrano, CA (US)

(72) Inventors: Varadaraju Gandikota, Cypress, TX (US); Venkat Mallela, San Marcos, CA (US); Andres Quiroga, San Bernardino, CA (US); Adam Sampson, Ramona, CA (US)

(73) Assignee: FLUIDMASTER, INC., San Juan Capistrano, CA (US)

( * ) Notice: Subject to any disclaimer, the term of this patent is extended or adjusted under 35 U.S.C. 154(b) by 58 days.

(21) Appl. No.: 15/903,915

(22) Filed: Feb. 23, 2018

(65) Prior Publication Data

US 2018/0238464 A1 Aug. 23, 2018

Related U.S. Application Data

(60) Provisional application No. 62/462,501, filed on Feb. 23, 2017.

(51) Int. Cl.
*F16K 31/126* (2006.01)
*F16K 47/06* (2006.01)
*F15D 1/02* (2006.01)

(52) U.S. Cl.
CPC ............ *F16K 31/126* (2013.01); *F15D 1/025* (2013.01); *F16K 47/06* (2013.01)

(58) Field of Classification Search
CPC .......... F16K 31/126; F16K 47/06; F15D 1/025
USPC ............................................. 138/46, 43, 42
See application file for complete search history.

(56) References Cited

U.S. PATENT DOCUMENTS

| | | | |
|---|---|---|---|
| 3,071,159 A * | 1/1963 | Bono Coraggioso Corrado | F28F 1/122 138/38 |
| 3,804,334 A * | 4/1974 | Curry | A01G 25/023 239/276 |
| 4,044,991 A * | 8/1977 | Waller | F16K 47/06 138/43 |
| 4,111,402 A * | 9/1978 | Barbini | B01F 3/10 138/38 |
| 4,127,332 A * | 11/1978 | Thiruvengadam | B01F 5/0615 366/131 |
| 4,331,293 A * | 5/1982 | Rangel-Garza | B05B 1/3447 239/542 |
| 5,343,754 A * | 9/1994 | Stone | G01L 9/0057 138/42 |
| 5,435,490 A * | 7/1995 | Machut | A01G 25/023 239/276 |

(Continued)

*Primary Examiner* — Craig M Schneider
*Assistant Examiner* — David R Deal
(74) *Attorney, Agent, or Firm* — Greenberg Traurig, LLP

(57) ABSTRACT

Some embodiments include a flow regulator with a main body dimensioned to be received within a flow passageway that includes an inlet and an outer surface, and an inner volume positioned within the main body and extending from the inlet along at least a partial length of the main body. Some embodiments includes two separate spiral structures positioned spiraled around the main body where one spiral extends further from the outer surface than the other. Some embodiments include a fluid flow space extending between the spirals. Based on a fluid pressure, the spirals can expand and contract to control the fluid flow space and affect downstream, fluid flow rate as a function of upstream fluid pressure.

20 Claims, 22 Drawing Sheets

(56) References Cited

U.S. PATENT DOCUMENTS

| | | | | |
|---|---|---|---|---|
| 5,527,433 | A * | 6/1996 | Begemann | D21F 1/06 138/43 |
| 6,644,620 | B2 * | 11/2003 | Johnson | B67D 3/045 222/504 |
| 6,981,689 | B2 * | 1/2006 | Mihaylov | F16K 47/12 137/556 |
| 8,376,053 | B2 * | 2/2013 | Obrejanu | E21B 17/00 166/242.3 |
| 2007/0102053 | A1 | 5/2007 | Le et al. | |
| 2018/0275687 | A1 * | 9/2018 | Han | G05D 7/0153 |

\* cited by examiner

FLOW REGULATOR

RELATED APPLICATIONS

This application claims priority to U.S. provisional application Ser. No. 62/462,501, filed on Feb. 23, 2017, the entire contents of which are incorporated herein by reference.

TECHNICAL FIELD

The present invention relates in general to fluid flow regulators and in particular to flow pressure regulators that maintain a substantially constant flow rate.

BACKGROUND

Fluid fill valves tend to be noisy when water passes through them to refill a tank (e.g., such as a toilet tank). It is common for water pressure and flow rates in supply lines to vary across different geographic regions, including across one country or state. Accordingly, even if identical fill valves are installed in different regions, the volume, flow rate and pressure of incoming water can vary drastically. The resulting inconsistency is undesirable particularly when excessive water pressure and/or flow rates lead to high levels of noise and waste of water.

What is instead desired is a simple solution that would provide a generally constant flow of water into the fill valve at different pressures. Such a solution would also reduce shock waves which can cause cavitation damage.

SUMMARY

Some embodiments include a flow regulator, comprising a main body dimensioned to be received within a flow passageway that includes at least one inlet and an outer surface, and an inner volume positioned within the main body and extending from the at least one inlet along at least a partial length of the main body. Some embodiments include a first spiral positioned spiraled around at least a partial length of the main body that includes a first spiral edge extending a first distance from the outer surface. Some embodiments include a second spiral positioned spiraled around at least a partial length of the main body that includes a second spiral edge extending a second distance from the outer surface, where the first distance is greater than the second distance.

Some embodiments include a fluid flow space extending between at the first spiral and the second spiral, and between the outer surface and at least the first and second spiral edges. Further, in some embodiments, the fluid flow space configured to receive fluid from at least a portion of the flow passageway, where the fluid comprises a fluid flow rate and a fluid pressure.

In some embodiments of the invention, the fluid flow space is configured and arranged to change based on the fluid pressure. In some embodiments, the change is caused by movement of at least the outer surface due to a decrease or increase of the fluid pressure in the inner volume.

In some embodiments, the inner volume comprises an open-ended cavity comprising the at least one inlet. In some embodiments, the main body is cylindrical. In some further embodiments, the main body comprises an elastomer. In some embodiments, at least a portion of the main body is flexible. In other embodiments, the main body is configured to be slidably or fixedly positioned in the flow passageway.

In some embodiments of the invention, a positioning of the flow regulator in a flow passageway creates a divide in the flow passageway comprising an upstream section adjacent the at least one inlet, and a downstream section adjacent the opposite end of the main body. In some embodiments, the main body is configured to adjust the fluid flow rate in the downstream section based at least in part on the fluid pressure.

In some embodiments, the fluid flow rate adjustment comprises a decrease in flow rate in the downstream section based at least in part on an increase in the flow pressure in the upstream section, where an increase in flow pressure in the inner volume produces movement of at least the outer surface. In some further embodiments, the fluid flow rate adjustment comprises a decrease in flow rate in the downstream section based on an increase in the flow pressure in the upstream section, where an increase in flow pressure in the inner volume produces movement of at least one of the first spiral edges and the second spiral edges outward from a central axis of the main body.

Some embodiments include a flow controller comprising an insert including at least one inlet of a pocket that extends at least a partial length of the insert and defining an adjustable inner volume. In some embodiments, a first spiral extends around at least a partial length of the insert, and extends from an outer surface of the insert to a first spiral edge. In some embodiments, a second spiral extends around at least a partial length of the insert parallel to the first spiral, and extends from the outer surface of the insert to a second spiral edge, where the distance between the outer surface and the second spiral edge being less than the distance between the outer edge and the first spiral edge.

In some embodiments, the insert comprises an adjustable fluid flow space extending between at the first spiral and the second spiral, and between the outer surface and at least the first and second spiral edges when positioned in a flow passageway. In some embodiments, the insert is configured so that the size of the inner volume is based on an exerted fluid pressure in the pocket.

Some embodiments include an increase in the fluid pressure that produces an increase in the size of the inner volume and a decrease in the fluid flow space. In some embodiments of the invention, an increase in the fluid pressure in the pocket produces a movement of at least one of the first spiral edges and the second spiral edges outward from the pocket.

In some further embodiments, the first spiral edges are parallel with a central axis of the insert. In some embodiments, the second spiral edges comprise a curve surface. In some embodiments, the insert comprises a flexible elastomer.

DETAILED DESCRIPTION

Figure 1:
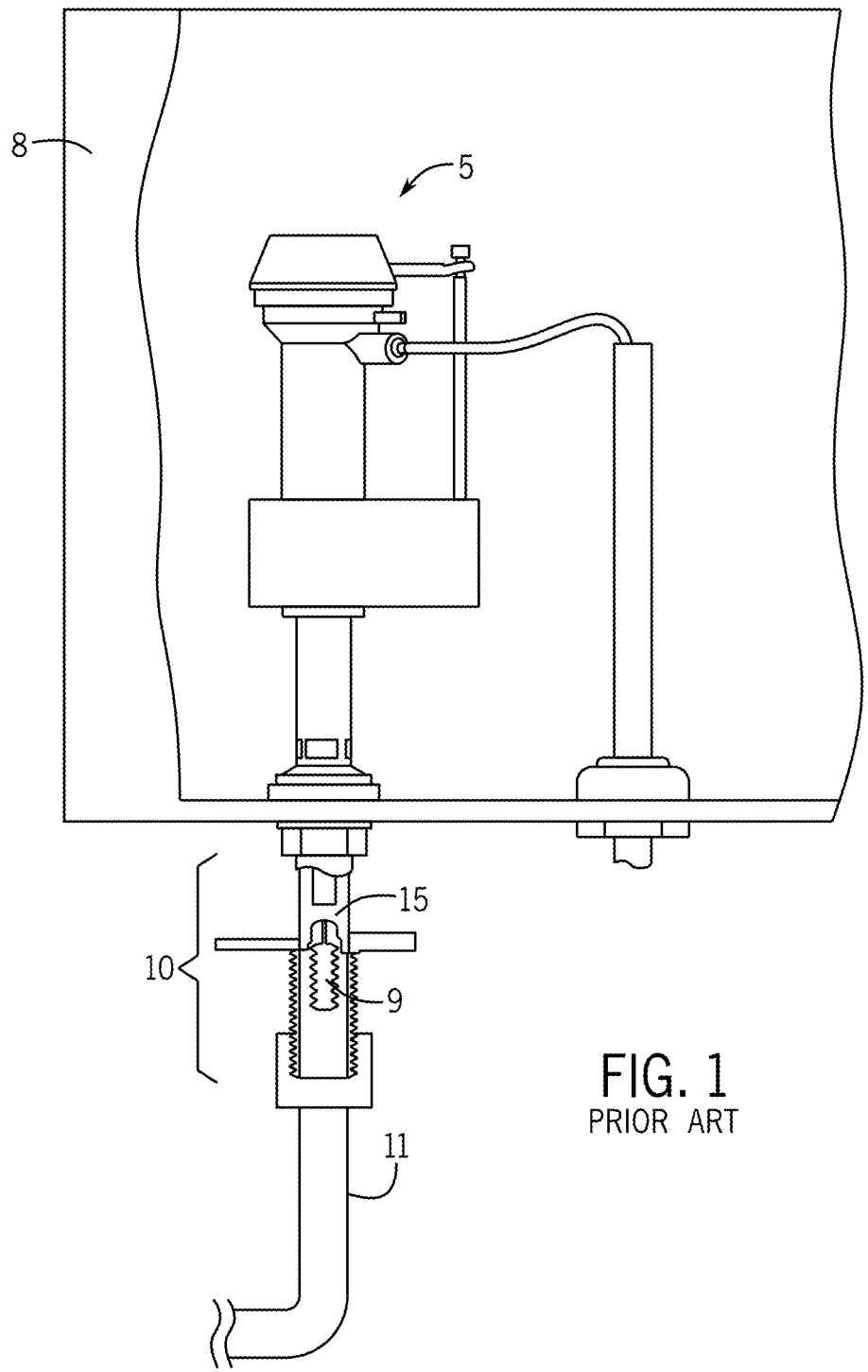
FIG. 1 is a sectional side elevation view of a pre-existing flow regulator positioned within a flow passageway connecting the water mains into the bottom of a fill valve in accordance with some embodiments of the invention.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

The following discussion is presented to enable a person skilled in the art to make and use embodiments of the invention. Various modifications to the illustrated embodiments will be readily apparent to those skilled in the art, and the generic principles herein can be applied to other embodiments and applications without departing from embodiments of the invention. Thus, embodiments of the invention are not intended to be limited to embodiments shown, but are to be accorded the widest scope consistent with the principles and features disclosed herein. The following detailed description is to be read with reference to the figures, in which like elements in different figures have like reference numerals. The figures, which are not necessarily to scale, depict selected embodiments and are not intended to limit the scope of embodiments of the invention. Skilled artisans will recognize the examples provided herein have many useful alternatives that fall within the scope of embodiments of the invention.

Some embodiments of the invention include a flow regulator that can be used to reduce fluid flow variations in a refill valve for a tank or any fluid reservoir. It is to be understood, however, the embodiments of the invention described herein are not limited to fill valves and can instead be used in a wide variety of other applications. Moreover, some embodiments of the invention described herein may provide noise reduction in fill valves. As such, some embodiments of the invention described herein can include a flow regulator or controller that can be used in any fluidic application where a generally constant flow is required over a range of different inlet pressures. As used herein, the term "fluid controller" and "fluid regulator" can be used interchangeably.

Some embodiments of the invention include a flow regulator that can be positioned within a flow tube or other flow passageway. In some embodiments, the flow regulator can include a centrally located aperture or passageway passing therethrough which opens from an inlet to an outlet. For example, some embodiments of the invention include a flow regulator that can be positioned in the water fill tube or passageway passing up into the bottom of a fluid valve. In some embodiments, the flow regulator can be made of an elastomeric material that can flex to achieve the desired flow characteristics therethrough. In some embodiments, the flow regulator can comprise a flexible or semi-flexible body with a passageway extending therethrough from one end to another end. For example, in at least one embodiment, the flow regulator can comprise a cylindrical elastomeric body with a passageway extending therethrough from an inlet (such as an opening at a bottom end of the regulator) of the cylindrical elastomeric body to an outlet (preferably on the top) of the cylindrical elastomeric body, where the outlet is wider than the inlet. In some embodiments, during use, as fluid pressure on the bottom of the elastomeric body is increased, the elastomeric body can deform so that the passageway through the elastomeric body shrinks such that the flow regulator can provide a generally constant rate of flow over a range of different pressures. In various optional embodiments, the elastomeric body can itself be placed into an insert, and in some embodiments, relief portions of the elastomeric body are cut away to permit the elastomeric body to flex and thus provide improved flow characteristics (such as reducing the potential for shock waves). In one embodiment, the expansion of the passageway is non-linear. In other embodiments, the expansion is linear.

In some embodiments of the invention, at least a portion of the flow regulator described herein can comprise a polymer-based material including one or more homopolymers, one or more copolymers, or mixtures thereof. In some embodiments, the material can comprise an elastomeric polymer such as rubber or silicone. In some embodiments, the rubber can be a natural rubber (e.g., such as natural gum rubber), a synthetic rubber, or combinations thereof. In some embodiments of the invention, the material can comprise a butyl or butylene rubber, ethylene propylene diene monomer (EPDM) rubber, neoprene rubber, nitrile rubber, silicone rubber, a polyurethane rubber, a fluoro-silicone, chloroprene rubber, nitrile rubber, or combinations thereof. In some embodiments, the material can include recycled rubber.

In some further embodiments of the invention, at least a portion of the flow regulator described herein can comprise a polymer-based matrix material including a dispersed or semi-dispersed secondary material. In some embodiments, the secondary material can influence the viscoelastic response of the material. For example, some embodiments include a material that can comprise one or more polymers infused with (or including a dispersion of) filler elements, filler compounds, and/or filler mixtures. For example, in some embodiments, at least a portion of the material can comprise a polymer-based matrix material including filaments or particles dispersed in a matrix to form a composite material. For example, some embodiments include a filler that can comprise a fibrous material. In some embodiments, at least a portion of the filler can be oriented in a preferred direction. In some other embodiments, the material can comprise a fiber-filled matrix material including natural or synthetic filaments dispersed in a matrix to form a fiber composite material. Some embodiments include a filler material that is at least partially dispersed through at least a portion of the material. In some embodiments, the filler material can be amorphous or crystalline, organic or inorganic material. In some other embodiments, the particle size of the filler material can be between 1-10 microns. In some other embodiments, at least some portion of the filler material can be sub-micron. In some other embodiments, at least a portion of the filler can comprise a nano-sized particle filler material.

In some embodiments of the invention, during operation, certain fluid flow pressures exerted on the inlet (e.g. bottom) of the regulator can cause the passageway through the elastomeric body of the regulator to shrink in diameter. As a result, the flow volume through the passageway can remain relatively constant even though the flow regulator is subjected to different fluid flow pressures. FIG. 1 provides an illustration of the use and placement of a conventional spiral flow regulator 9 in a fill valve. A fill valve 5 is shown positioned in a tank 8. Piping 10 provides a refill tube or passageway that connects fill valve 5 to the water mains 11. Spiral flow path regulator 9 is placed in piping 10 to ensure that a generally constant flow of water goes into fill valve 5 over a range of different water pressures in the water mains. An exemplary embodiment of conventional regulator 9 can be found in published United States Patent Application 2007/0102053, entitled "Plumbing Fill Valve Restrictor And Regulator". In some embodiments, the regulator 9 can be held in position by a shank 15, with the top of flow regulator being positioned against the bottom of shank 15, as shown. The shank 15 thereby prevents regulator (9 or 20 or 40 or 60) from being pushed upwardly in pipe 10. As illustrated, shank 15 may be fully circular, or it may instead comprise a set of radially expanding ribs.

Figure 2A:
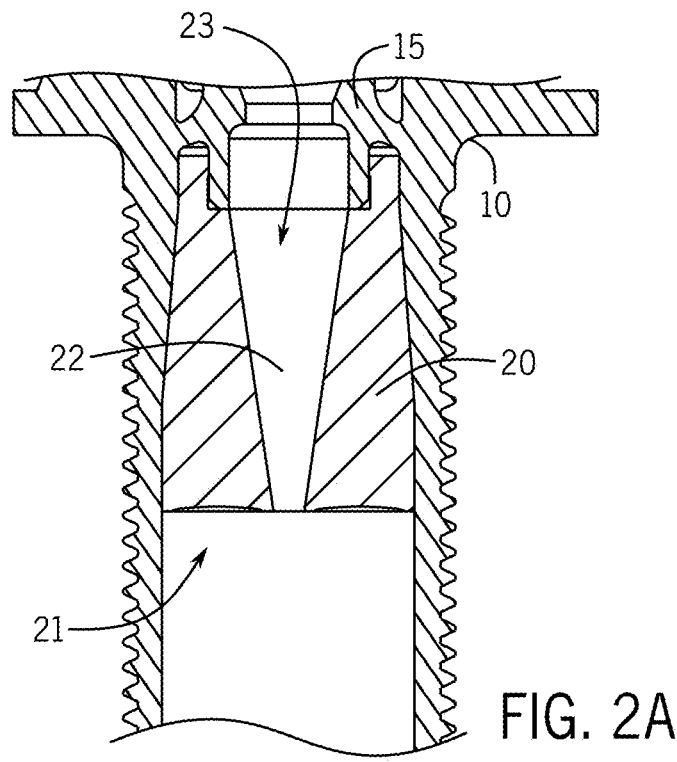
FIG. 2A is a sectional elevation view of a first embodiment of the flow regulator positioned in a pipe in accordance with some embodiments of the invention.
Figure 2B:
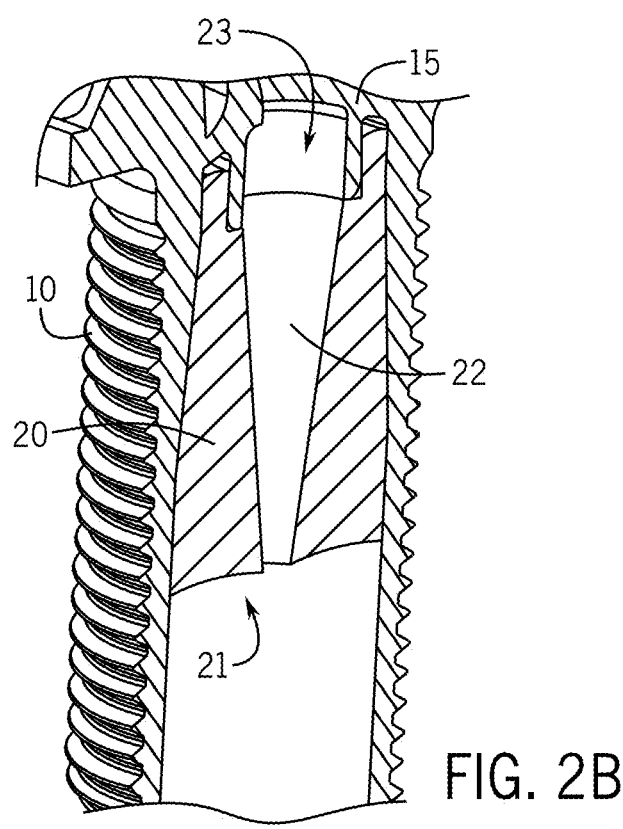
FIG. 2B is a sectional perspective view corresponding to FIG. 2A in accordance with some embodiments of the invention.
Figure 2C:
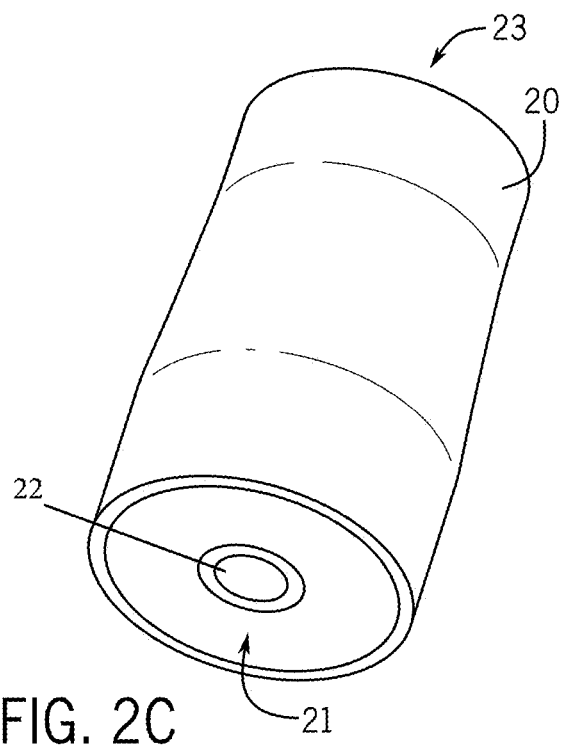
FIG. 2C is an inlet side perspective view of the flow regulator of FIG. 2A in accordance with some embodiments of the invention.
Figure 2D:
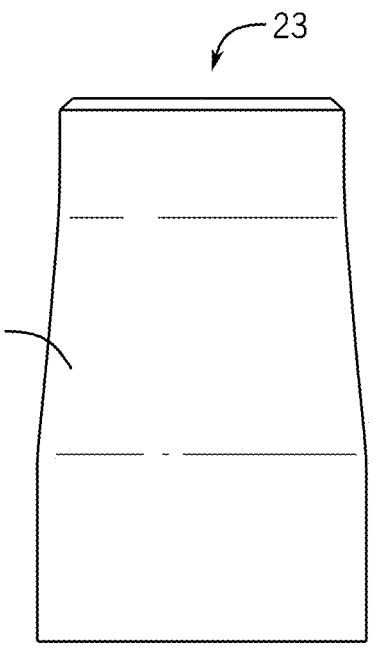
FIG. 2D shows a side view of the flow regulator of FIG. 2A in accordance with some embodiments of the invention.
Figure 2E:
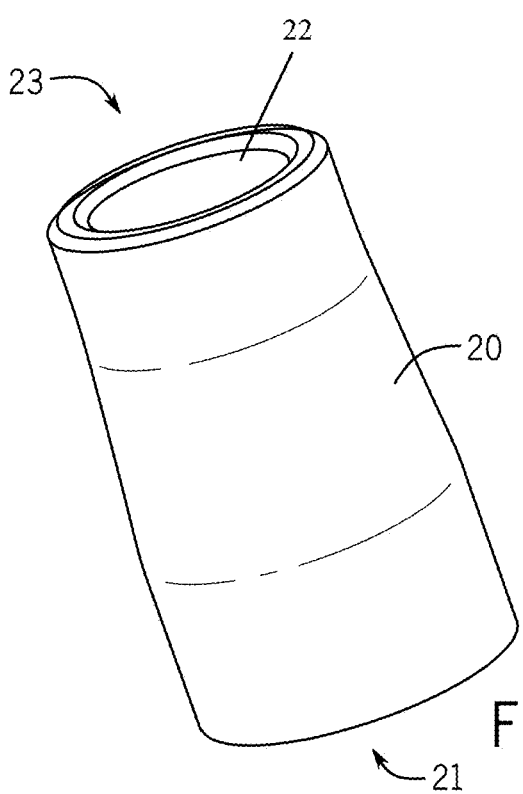
FIG. 2E illustrates an outlet side perspective view of the flow regulator of FIG. 2A in accordance with some embodiments of the invention.

In reference to FIGS. 2A-2E, 3A-3E, 4A-4D, 5A-5C, 6A-6B, 7A-7B, 8A-8C, 9A-9C, 10A-10C, and 11A-11B, some embodiments provide novel elastomeric regulators (20, 30, 40, 50, 60, 70, 80, 90, 100, 120 and 150) that can be substituted for the conventional regulator 9 of FIG. 1, and/or other conventional regulators. For example, FIG. 2A is a sectional elevation view of a first embodiment of the flow regulator 20 positioned in a pipe in accordance with some embodiments of the invention. Further, FIG. 2B is a sectional perspective view corresponding to FIG. 2A in accordance with some embodiments of the invention. For clarity, views of the flow regulator 20 outside of pipe 10 are shown in FIGS. 2C-2E. For example, FIG. 2C is an inlet side perspective view of the flow regulator of FIG. 2A in accordance with some embodiments of the invention. Further, FIG. 2D shows a side view of the flow regulator of FIG. 2A, and FIG. 2E illustrates an outlet side perspective view of the flow regulator of FIG. 2A in accordance with some embodiments of the invention.

FIGS. 2A and 2B shows a first embodiment of flow regulator 20 positioned in flow pipe 10 under shank 15. In various embodiments, the shank 15 may be fully circular as shown or may consist of a plurality of radial spokes. As shown in FIGS. 2C-2E, in some embodiments, the flow regulator 20 can comprise a generally cylindrical body including a passageway 23 that extends from an inlet 21 at one end and an outlet 23 at the opposite end. In some embodiments, the body of flow regulator 20 is cylindrical fitting within pipe 10, as shown. In some embodiments, the flow regulator 20 can comprise an elastomeric body comprising one or more elastomeric materials.

As can be seen from at least FIGS. 2A-2C, and 2E, channel or passageway 22 can be located approximately in the center of the body of the flow regulator. As such, in some embodiments, the channel or passageway 22 can be centered around the central longitudinal axis passing from the top to the bottom through the cylindrical elastomeric body. In some embodiments, in the illustrated embodiment of the flow regulator of FIGS. 2A and 2B, channel or passageway 22 can expand linearly from inlet 21 to outlet 23, wherein inlet 21 is narrower than outlet 23. In other words, the rate at which passageway 22 expands is constant moving from the bottom to top of the body. Thus, as seen in FIG. 2B, channel or passageway 22 can be conically-shaped where the diameter of the inlet 21 is smaller than the diameter of the outlet 23.

Figure 2F:
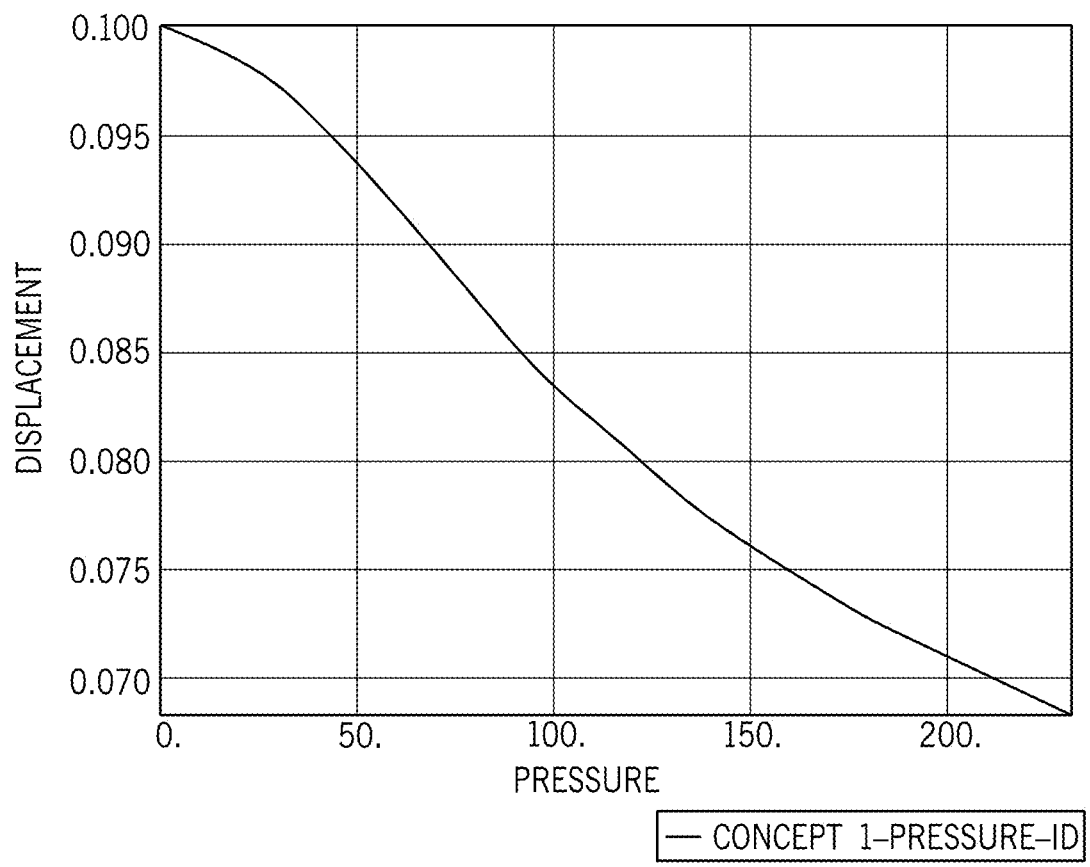
FIG. 2F is a graph showing data of pressure vs. inner diameter aperture change for the flow regulator of FIGS. 2A-2E in accordance with some embodiments of the invention.

The Applicants performed computer simulations of various embodiments of the invention over a pressure range of 20 psi to 232 psi and over a flow rate of 1 GPm to 1.5 GPm. It is to be understood however that the embodiments described herein can be used for other pressures and flow rates, all keeping within the scope of the embodiments of the invention. FIG. 2F is a graph showing a computer simulation of "Pressure" vs. "Inner Diameter Aperture Change" for flow regulator 20. Thus, this graph illustrates the change in the diameter of narrow inlet 21 for various pressures. As can be seen, the relationship between the fluid flow pressure exerted and the size of the passageway through the elastomeric body is approximately linear (i.e.: the relationship between fluid flow pressure on the bottom of regulator 20 and flow volume passing through the regulator is approximately linear). The actual flow volume passing through each of inlet 21, passageway 22 and outlet 23 will be the same, but the flow will slow down as it proceeds through the regulator. As a result, the flow speed will drop from inlet 21 to outlet 23. The effect of slowing the flow passing through the regulator 20 can include noise reduction of the water passing into fill valve 5.

Figure 3A:
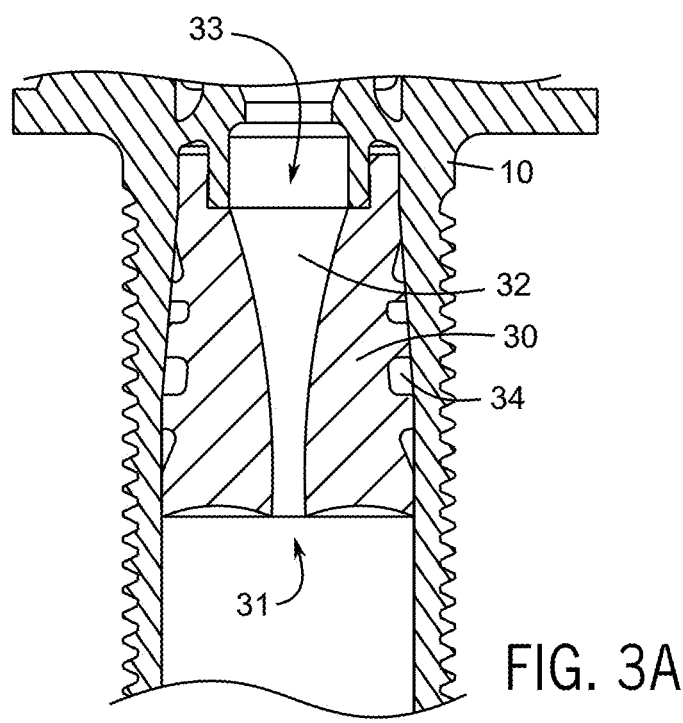
FIG. 3A is a sectional elevation view of a flow regulator positioned in a pipe in accordance with some further embodiments of the invention.
Figure 3B:
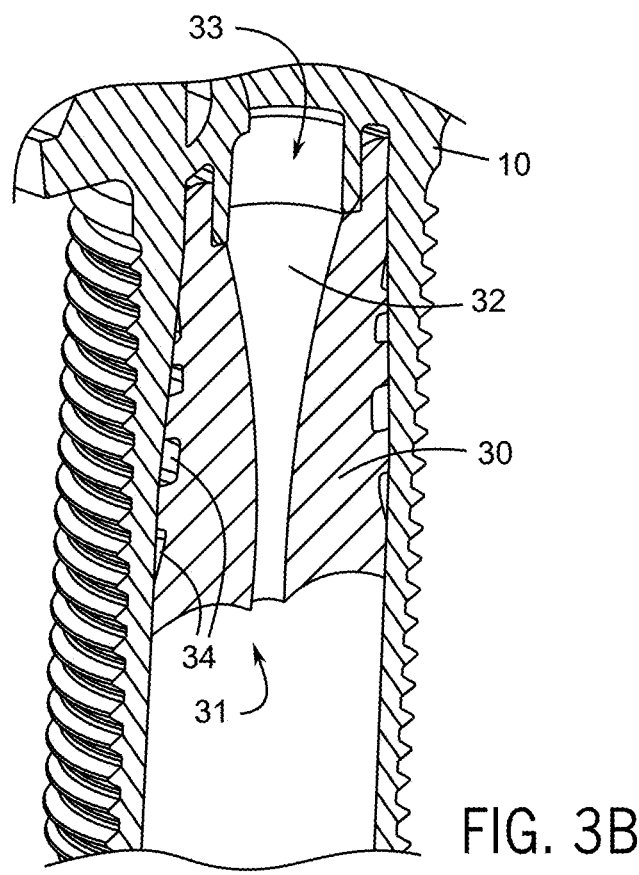
FIG. 3B is a sectional perspective view corresponding to FIG. 3A in accordance with some embodiments of the invention.
Figure 3C:
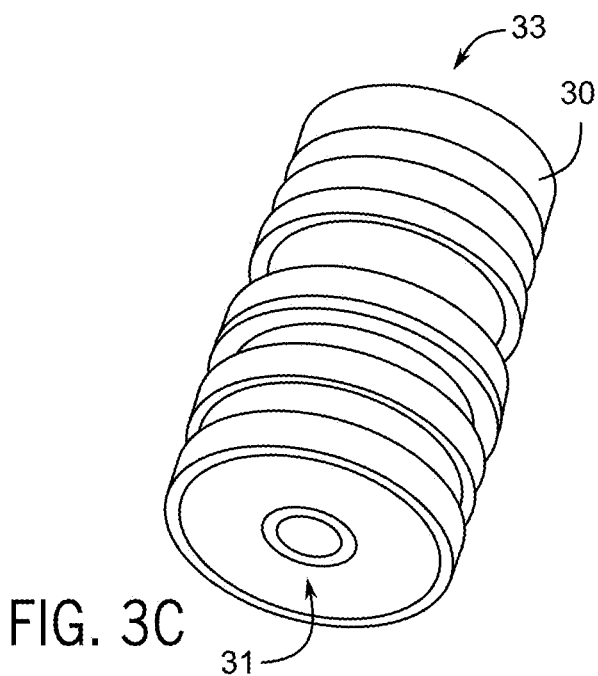
FIG. 3C is an inlet side perspective view corresponding to FIG. 3A in accordance with some embodiments of the invention.
Figure 3D:
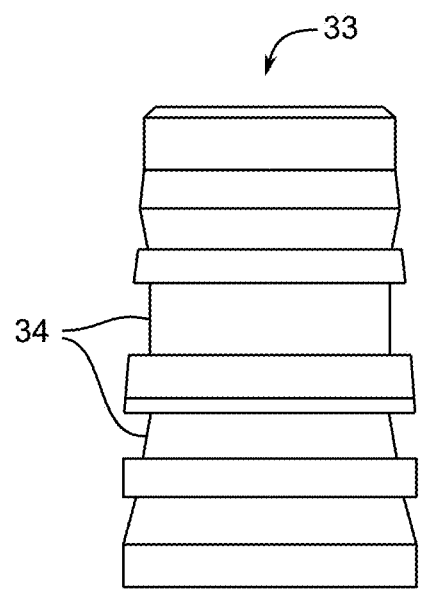
FIG. 3D is a side elevation view corresponding to FIG. 3A in accordance with some embodiments of the invention.
Figure 3E:
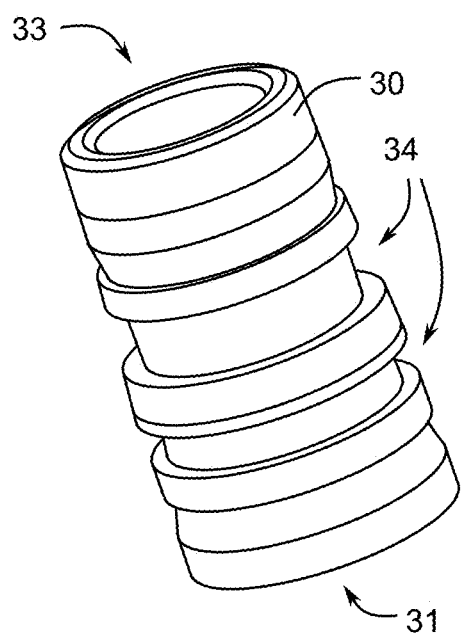
FIG. 3E is an outlet side perspective view corresponding to FIG. 3A in accordance with some embodiments of the invention.

FIGS. 3A to 3E illustrates a second embodiment of flow regulator 20. For example, FIG. 3A is a sectional elevation view of a flow regulator 30 positioned in a pipe 10 in accordance with some further embodiments of the invention. FIG. 3B is a sectional perspective view corresponding to FIG. 3A, and FIG. 3C is an inlet side perspective view corresponding to FIG. 3A in accordance with some embodiments of the invention. Further, FIG. 3D is a side elevation view corresponding to FIG. 3A, and FIG. 3E is an outlet side perspective view corresponding to FIG. 3A in accordance with some embodiments of the invention. In some embodiments, the flow regulator 30 can comprise a generally cylindrical body including a passageway 32 that extends from an inlet 31 at one end and an outlet 33 at the opposite end. In some embodiments, the body of flow regulator 30 is cylindrical fitting within pipe 10, as shown. In this embodiment, channel or passageway 32 expands non-linearly from inlet 31 to outlet 33 (i.e.: with the channel or passageway 32 expanding at an increasing rate closer to the wide outlet 33). In other words, the rate of expansion of the diameter of the passageway 32 increases moving from the bottom of the body at the inlet 31 and to the top of the body at the outlet 33. Thus, as seen in FIG. 3B, channel or passageway 32 flares outwardly and is more "trumpet-shaped". In some embodiments, the flow regulator 30 can comprise an elastomeric body comprising one or more elastomeric materials.

In some embodiments, flow regulator 30 can include optional cut-away relief portions 34 that wrap around the outer circumference of the cylindrical elastomeric body. As illustrated, in some embodiments, cut-away relief portions 34 optionally comprise larger cut-away relief portions nearer to the middle of the cylindrical elastomeric body and smaller cut-away relief portions nearer to the top and bottom of the cylindrical elastomeric body (i.e., closer to the inlet 31 and outlet 33). In some embodiments, the cut-away relief portions 34 can permit the elastomeric body to flex in a manner such that channel or passageway 32 will be slightly more pinched when the bottom of the elastomeric body is exposed to higher fluid flow pressures. In some embodiments, relief portions 34 can permit flow regulator 30 to flex both axially and laterally.

Figure 3F:
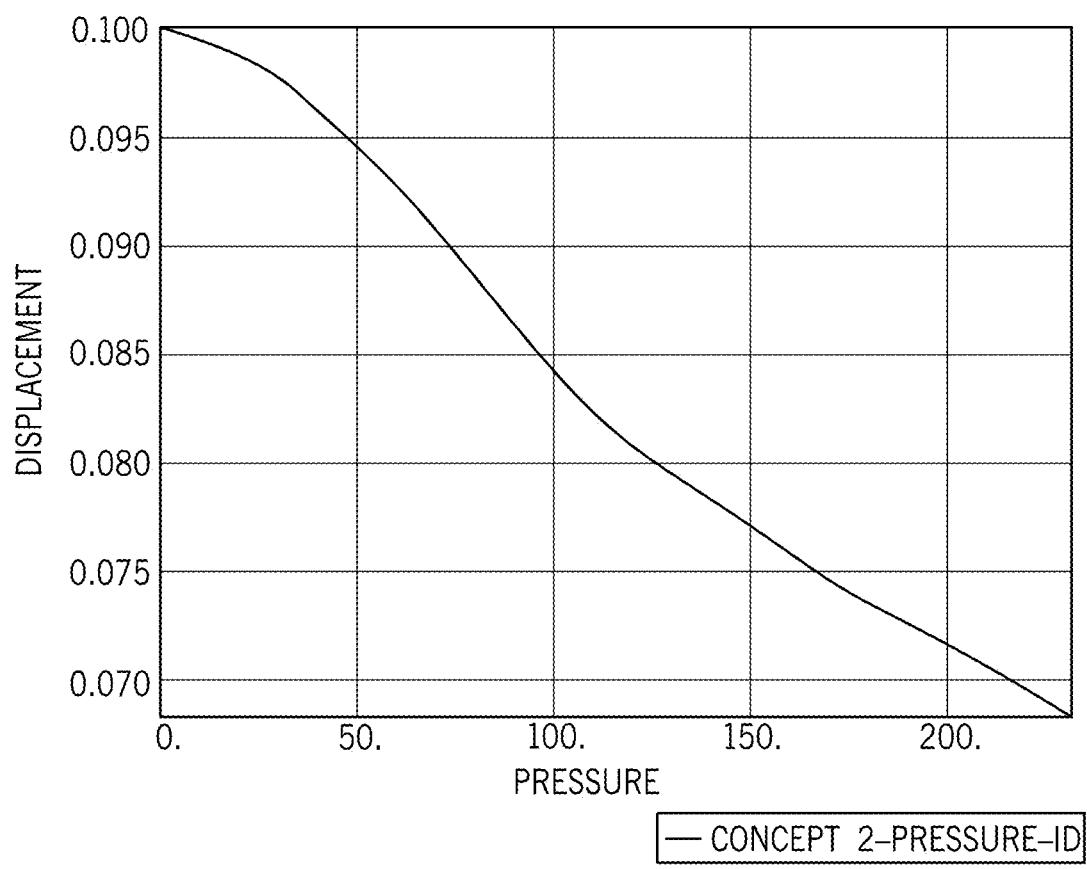
FIG. 3F is a graph showing data of pressure vs. inner diameter aperture change for the flow regulator of FIGS. 3E-3F in accordance with some embodiments of the invention.

FIG. 3F is a graph showing a computer simulation of "Pressure" vs. "Inner Diameter Aperture Change" for flow regulator 30. Thus, this graph illustrates the change in the diameter of narrow inlet 31 for various fluid flow pressures. As can be seen, the relationship is approximately linear with the relationship between the fluid flow pressure on the bottom of regulator 30 and flow volume passing through the regulator being approximately linear.

Figure 4A:
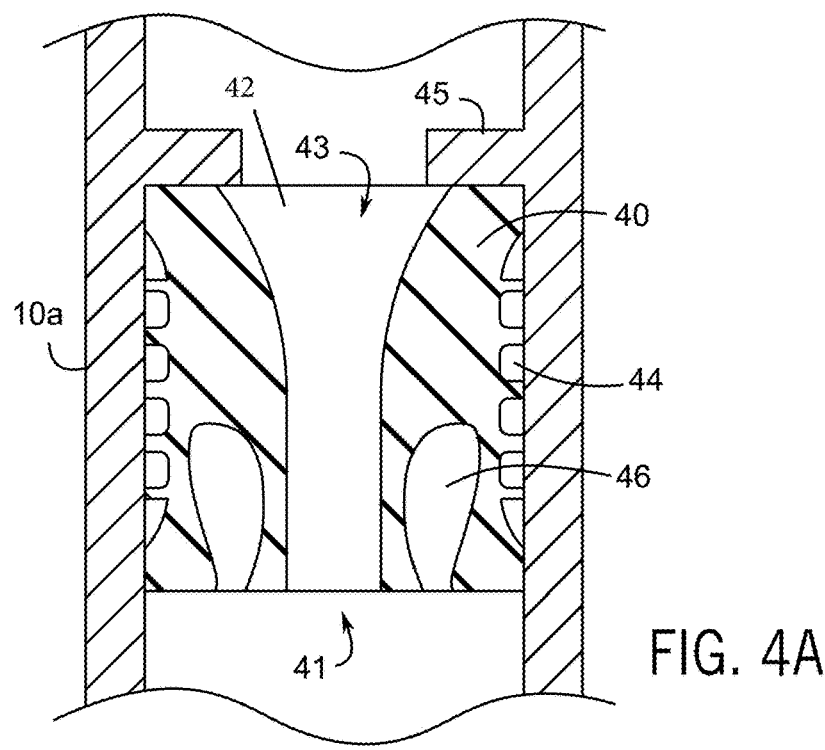
FIG. 4A is a sectional side elevation view of a third embodiment of the flow regulator in a pipe under no or little fluid flow pressure in accordance with some embodiments of the invention.
Figure 4B:
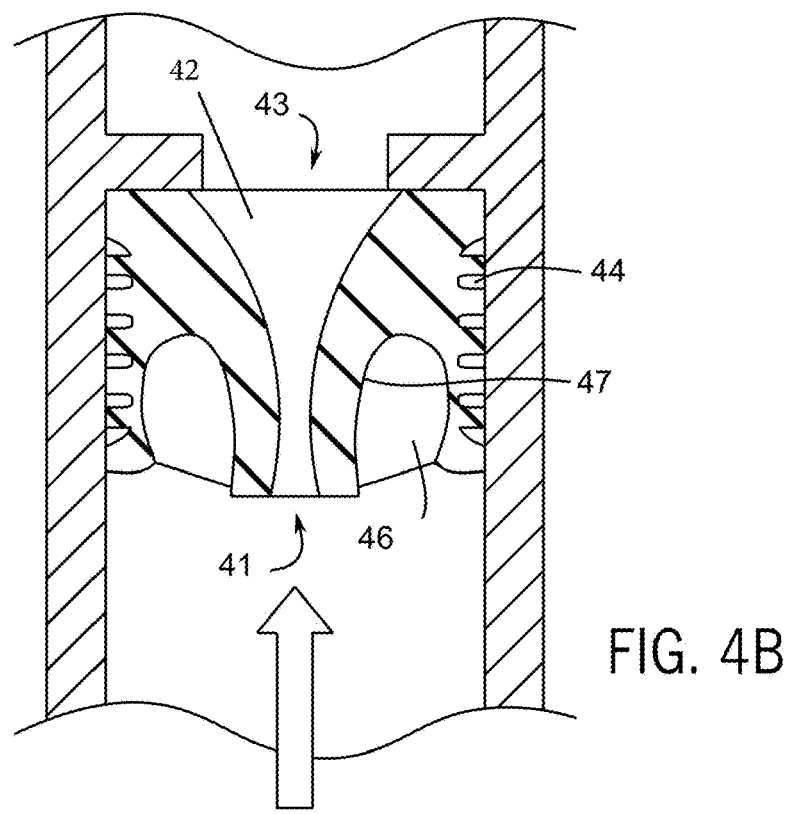
FIG. 4B is a sectional side elevation view of the embodiment of FIG. 4A, but under higher fluid flow pressure in accordance with some embodiments of the invention.
Figure 4C:
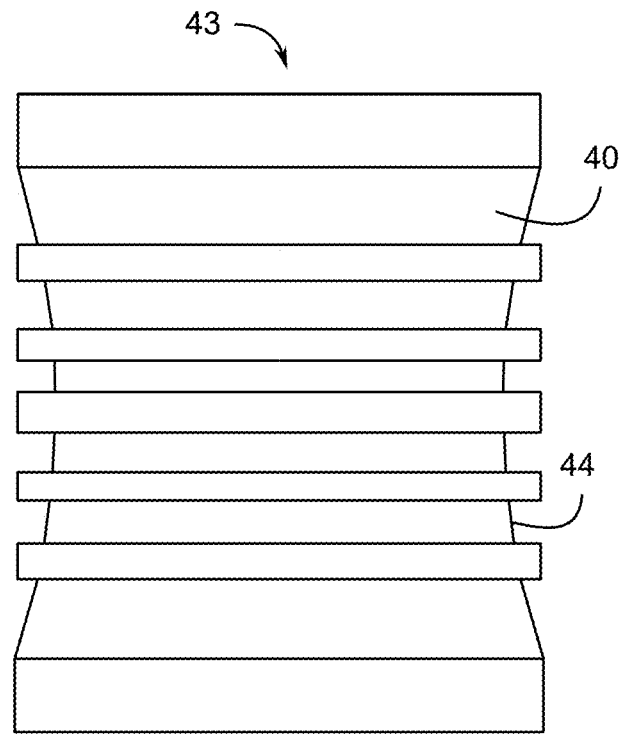
FIG. 4C is a side elevation view corresponding to FIG. 4A in accordance with some embodiments of the invention.
Figure 4D:
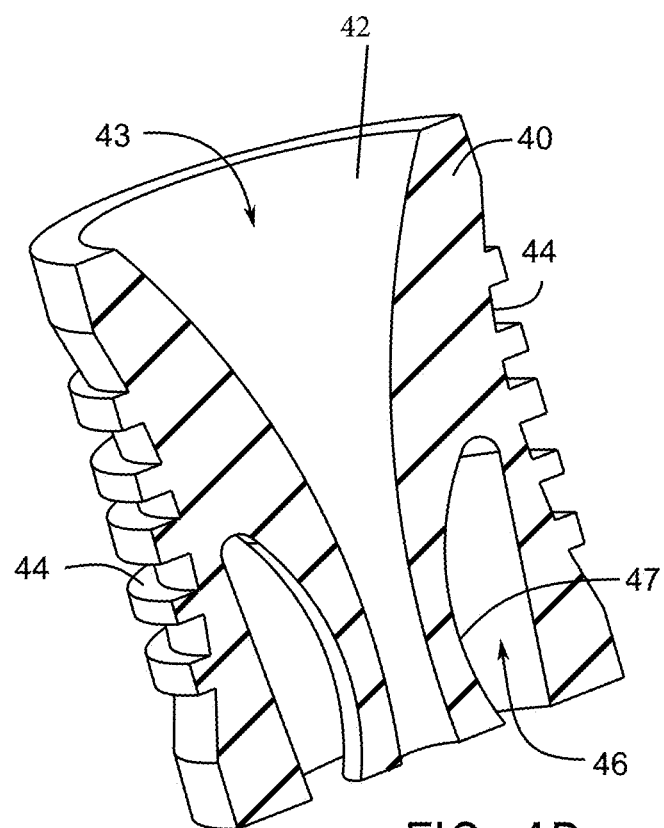
FIG. 4D is a sectional perspective view corresponding to FIG. 4A in accordance with some embodiments of the invention.

FIGS. 4A to 4D illustrate a third embodiment of flow regulator 20. For example, FIG. 4A is a sectional side elevation view of a flow regulator 40 in a pipe 10a under no or little fluid flow pressure in accordance with some embodiments of the invention. FIG. 4B is a sectional side elevation view of the embodiment of FIG. 4A, but under higher fluid flow pressure in accordance with some embodiments of the invention. FIG. 4C is a side elevation view corresponding to FIG. 4A in accordance with some embodiments of the invention. FIG. 4D is a sectional perspective view corresponding to FIG. 4A in accordance with some embodiments of the invention.

In some embodiments, the flow regulator 40 can comprise a generally cylindrical body including a passageway 42 that extends from an inlet 41 at one end and an outlet 43 at the opposite end. In some embodiments, the body of flow regulator 40 can be cylindrical, fitting within pipe 10, as shown. In this embodiment, channel or passageway 42 can expand along at least a partial length of the flow regulator 40 non-linearly from inlet 41 to outlet 43 (i.e.: with the channel or passageway 42 expanding at an increasing rate closer to the wide outlet 43). In other words, the rate of expansion of passageway 42 increases moving from the bottom of the body at the inlet 41 and towards the top of the body at the outlet 43. Thus, as seen in FIG. 4A, channel or passageway 42 flares outwardly and is more "trumpet-shaped". In some embodiments, the flow regulator 40 can comprise an elastomeric body comprising one or more elastomeric materials.

In some embodiments of the invention, channel or passageway 42 can be at least partially surrounded by a pocket 46. For example, as can be seen, in some embodiments, the pocket 46 can be wrapped around the passageway adjacent the inlet 41. In some embodiments, the pocket 46 comprises inner walls 47 that can be curved towards the portion of the channel or passageway 42 near inlet 41.

In some embodiments, flow regulator 40 can include optional cut-away relief portions 44 that wrap around the outer circumference of the cylindrical elastomeric body. In some embodiments, the cut-away relief portions 44 can permit the elastomeric body to flex in a manner such that channel or passageway 42 will be slightly more pinched when the bottom of the elastomeric body is exposed to higher fluid flow pressures. In some embodiments, relief portions 44 can permit flow regulator 40 to flex both axially and laterally. In some embodiments, cut-away relief portions 44 can optionally comprise larger cut-away relief portions nearer to the middle of the cylindrical elastomeric body and smaller cut-away relief portions nearer to the top and bottom of the cylindrical elastomeric body (i.e., closer to the inlet 41 and outlet 43).

FIG. 4A shows the flow regulator 40 under little or no fluid flow pressure, and FIG. 4B shows the regulator under a higher fluid flow pressure. As can be seen, as the fluid flow pressure on the bottom of regulator 40 is increased, pocket 46 can deform such that inner walls 47 can move laterally inwardly, thereby causing the diameter of at least a portion of the passageway 42 to shrink. In addition, in some embodiments, cut away relief portions 44 can at least partially contract. In some embodiments, the structure and behavior of the flow regulator 40 as described can ensure a relatively constant rate of flow at the higher fluid flow pressures. In some embodiments, cut-away relief portions 44 can be distributed evenly-spaced along at least a partial length of the flow regulator 40 inlet 41 and outlet 43). In some other embodiments (not shown), cut-away relief portions 44 can optionally comprise larger cut-away relief portions nearer to the middle of the cylindrical elastomeric body and smaller cut-away relief portions nearer to the top and bottom of the cylindrical elastomeric body (i.e., closer to the inlet 41 and outlet 43).

Figure 4E:
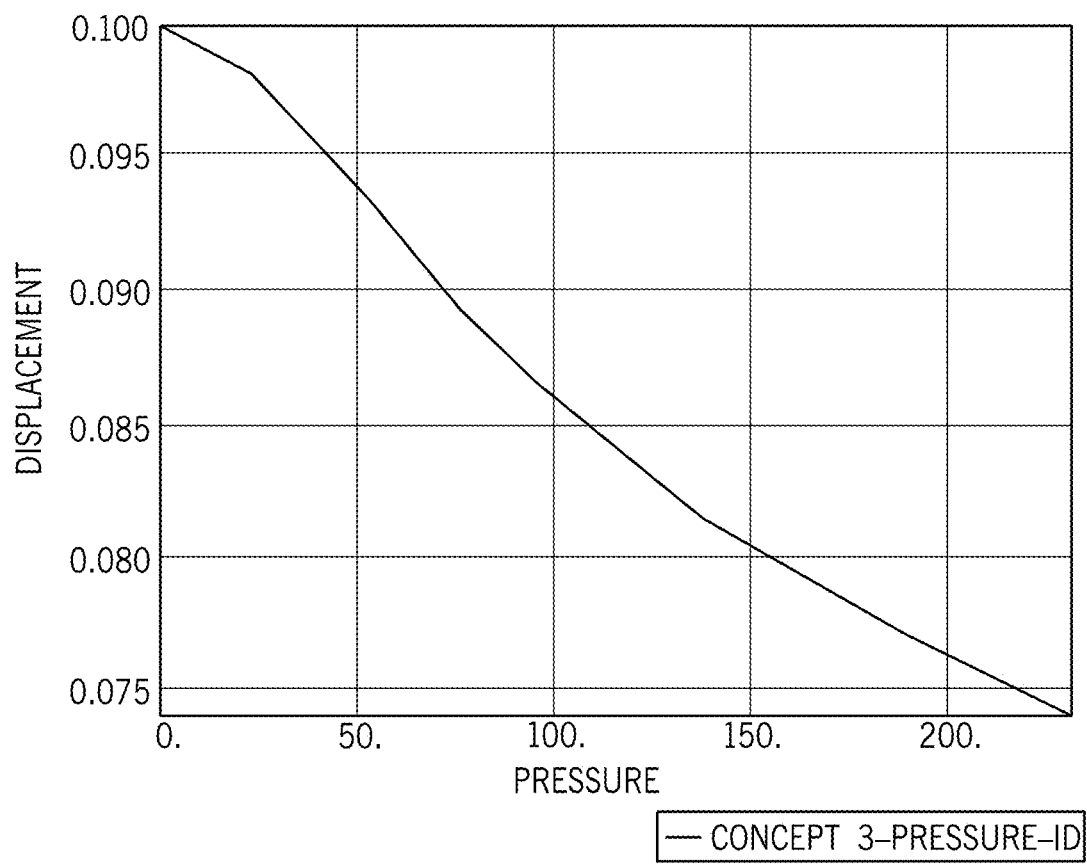
FIG. 4E is a graph showing data of pressure vs. inner diameter aperture change for the flow regulator of FIG. 4A to 4D in accordance with some embodiments of the invention.

FIG. 4E is a graph showing a computer simulation of "Pressure" vs. "Inner Diameter Aperture Change" for flow regulator 40, and illustrates the change in the diameter of narrow inlet 41 for various fluid flow pressures. As can be seen, the relationship is approximately linear with the relationship between the fluid flow pressure on the bottom of regulator 40 and flow volume passing through the regulator being approximately linear.

Figure 5A:
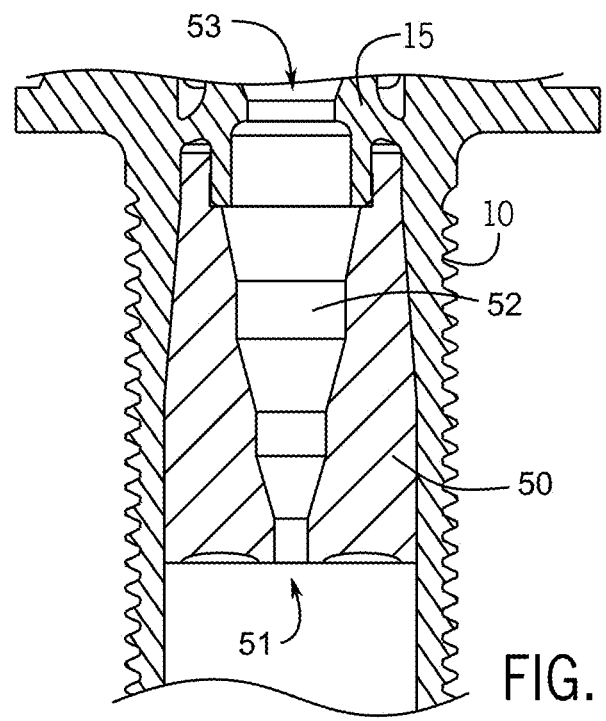
FIG. 5A is a sectional side elevation view of another embodiment of the flow regulator in a pipe in accordance with some embodiments of the invention.
Figure 5B:
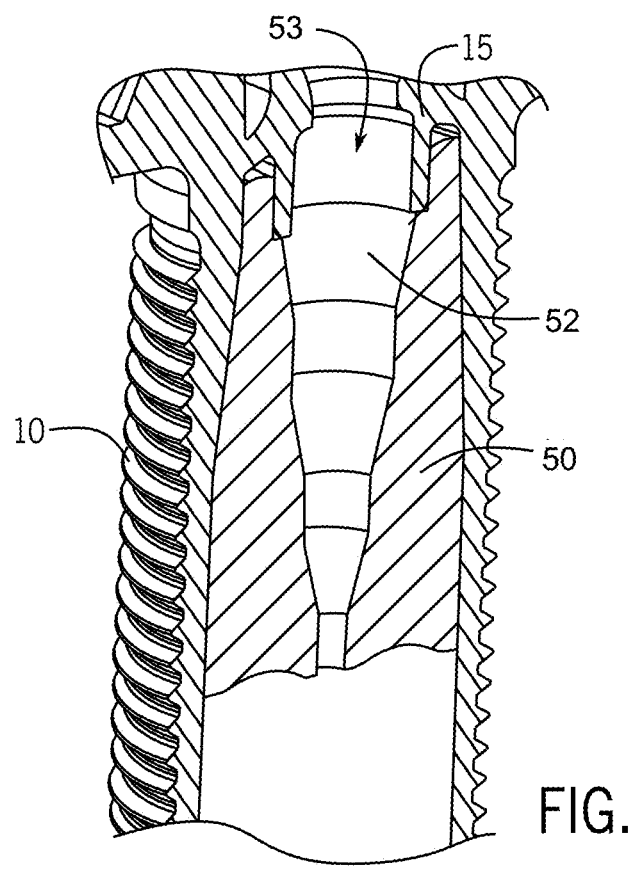
FIG. 5B is a sectional perspective view corresponding to FIG. 5A in accordance with some embodiments of the invention.
Figure 5C:
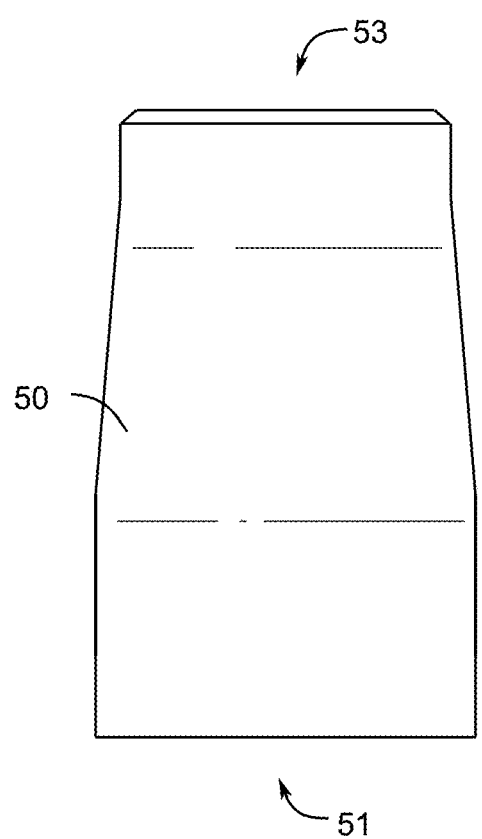
FIG. 5C is a side view corresponding to FIG. 5A in accordance with some embodiments of the invention.
Figure 5D:
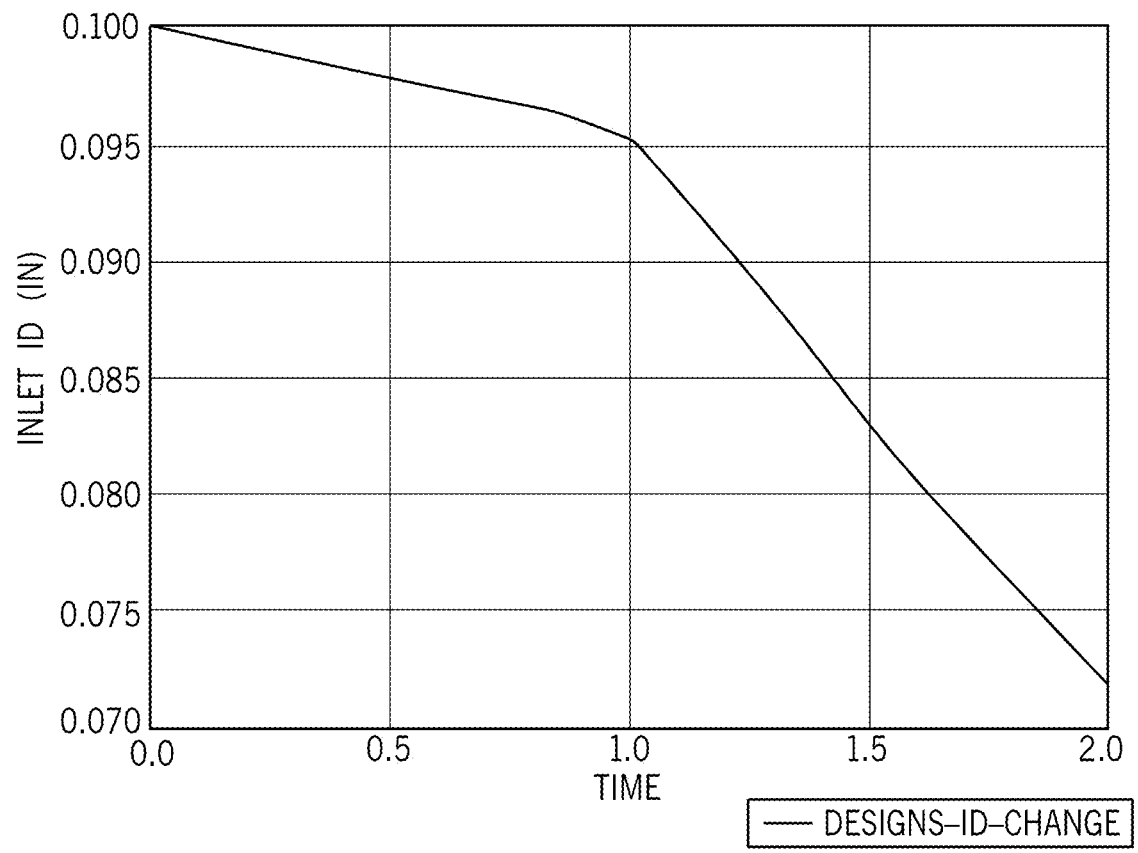
FIG. 5D is a graph showing data of pressure vs. inner diameter aperture change for the flow regulator of FIGS. 5A-5C in accordance with some embodiments of the invention.

FIGS. 5A-5C illustrate a further embodiment of flow regulator 20. For example, FIG. 5A is a sectional side elevation view of a flow regulator 50 in a pipe 10 in accordance with some embodiments of the invention. Further, FIG. 5B is a sectional perspective view corresponding to FIG. 5A in accordance with some embodiments of the invention, and FIG. 5C is a side view corresponding to FIG. 5A in accordance with some embodiments of the invention. In this embodiment, channel or passageway 52 expands in a (non-linear) stepped arrangement from narrow inlet 51 to wide outlet 53 so that the diameter of the channel or passageway 52 is smaller at the inlet 51 than at the outlet 53. In some embodiments, the number of steps and/or the rate of change of diameter of the steps can differ from the non-limiting embodiment shown. In some embodiments, the advantage of this stepped embodiment is that it reduces the potential for shocks which would otherwise produce cavitation of the elastomeric body. The non-limiting embodiment of FIGS. 5A-5C shows three steps, however additional numbers of steps can be used. FIG. 5D is a graph showing a computer simulation of "Pressure" vs. "Inner Diameter Aperture Change" for flow regulator 50.

Figure 6A:
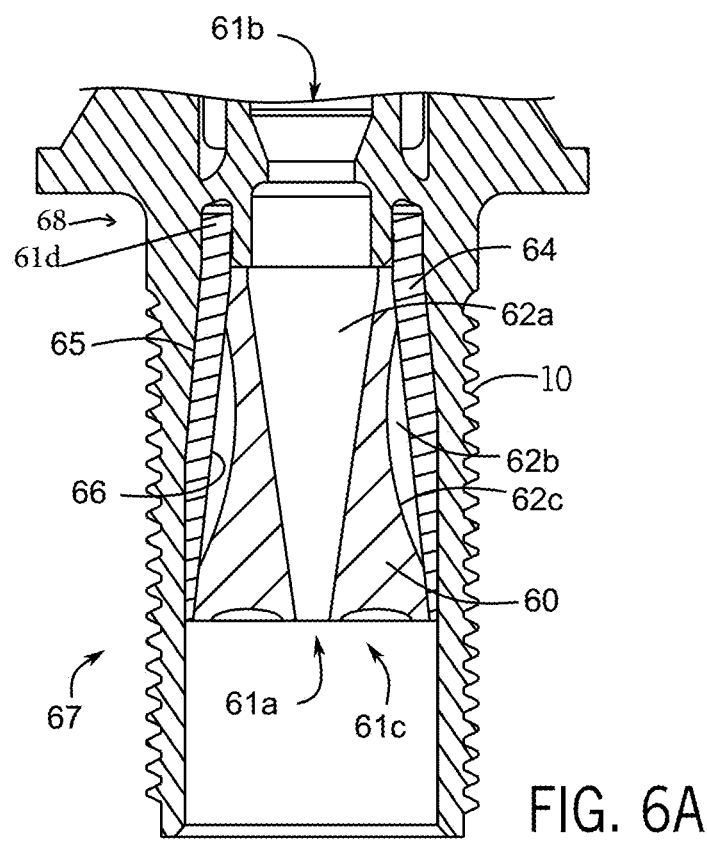
FIG. 6A is a sectional side elevation view of another embodiment of the flow regulator in a pipe in accordance with some embodiments of the invention.
Figure 6B:
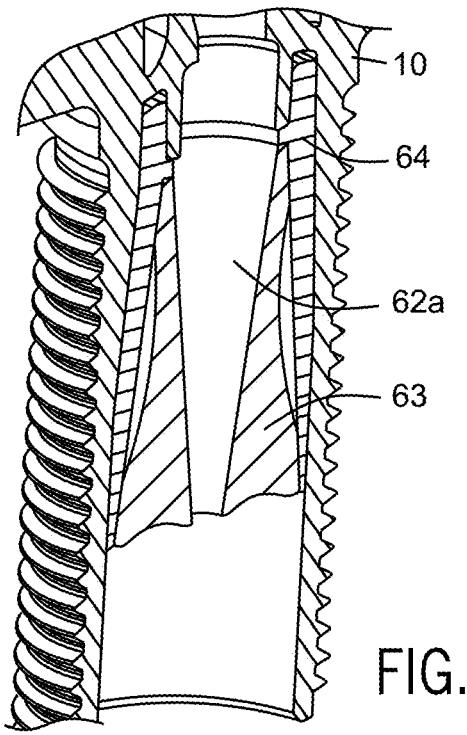
FIG. 6B is a sectional perspective view corresponding to FIG. 6A in accordance with some embodiments of the invention.

FIGS. 6A and 6B illustrate a further embodiment for the flow regulator. In this embodiment, the flow regulator 60 comprises an insert 64 that is dimensioned to be received within flow pipe 10. In some embodiments, the insert 64 has an outer cylindrical surface 65 and an inner tapering surface 66 that tapers from a wide bottom opening 67 to a narrow top opening 68 that comprises a diameter less than the wide bottom opening 67. In addition, in some embodiments, the flow regulator 60 can comprise an elastomeric body 63 dimensioned to be received within insert 64. In some embodiments, the elastomeric body 63 can include a wide bottom 61c and a narrow top 61d. Similar to the above described embodiments, channel or passageway 62a extends in an axial direction through the center of the elastomeric body from a narrow inlet 61a on the bottom of the elastomeric body to a wide outlet 61b on the top of the cylindrical elastomeric body 63.

In some embodiments, the flow regulator 60 can comprise a passageway 62a that extends from an inlet 61a at one end (the bottom end) and to an outlet 61b at the opposite end. In some embodiments, the body of flow regulator 60 can be cylindrical, fitting within pipe 10, as shown. In this embodiment, channel or passageway 62a can expand at least a partial length of the flow regulator 60 linearly from inlet 61a to outlet 61b, so that the diameter of the inlet 61a is less than the diameter of the outlet 61b.

In some embodiments, the elastomeric body 63 further comprises an inwardly curved outer surface 62c. In some embodiments, the inwardly curved outer surface 62c can form a gap 62b between inner surface 66 of insert 64, and the outer surface 62c of the elastomeric body. In some embodiments, as the fluid flow pressure on the bottom of regulator 40 (adjacent to inlet 61a) is increased, elastomeric body 63 can deform such that inwardly curved outer surface 62c can move inwardly, causing the diameter of channel or passageway 62a to shrink. In some embodiments, the overall result will be to ensure a relatively constant rate of flow at the higher fluid flow pressures.

Figure 6C:
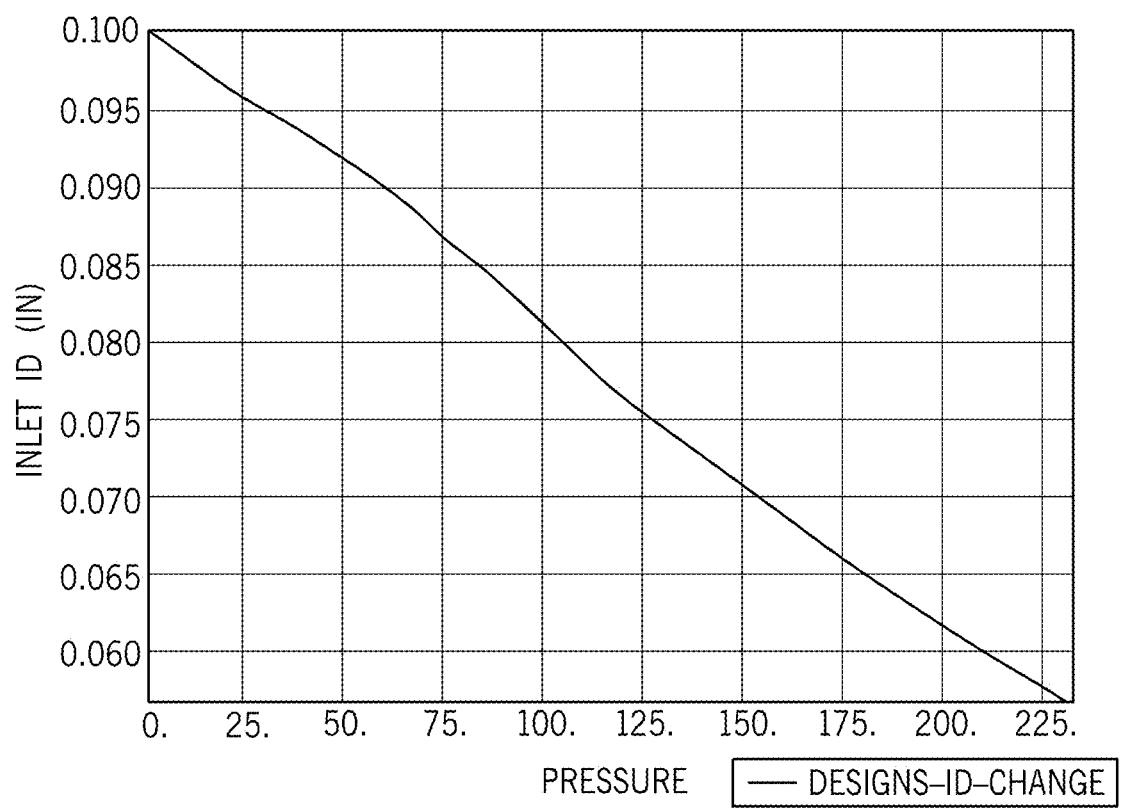
FIG. 6C is a graph showing data of pressure vs. inner diameter aperture change for the flow regulator of FIGS. 6A and 6B in accordance with some embodiments of the invention.

FIG. 6C is a graph showing a computer simulation of "Pressure" vs. "Inner Diameter Aperture Change" for flow regulator 60. Thus, this graph illustrates the change in the diameter of narrow inlet 61a for various pressures. As can be seen, the relationship is approximately linear with the relationship between pressure on the bottom of the flow regulator 60 and flow volume passing through the flow regulator 60 being approximately linear.

Figure 7A:
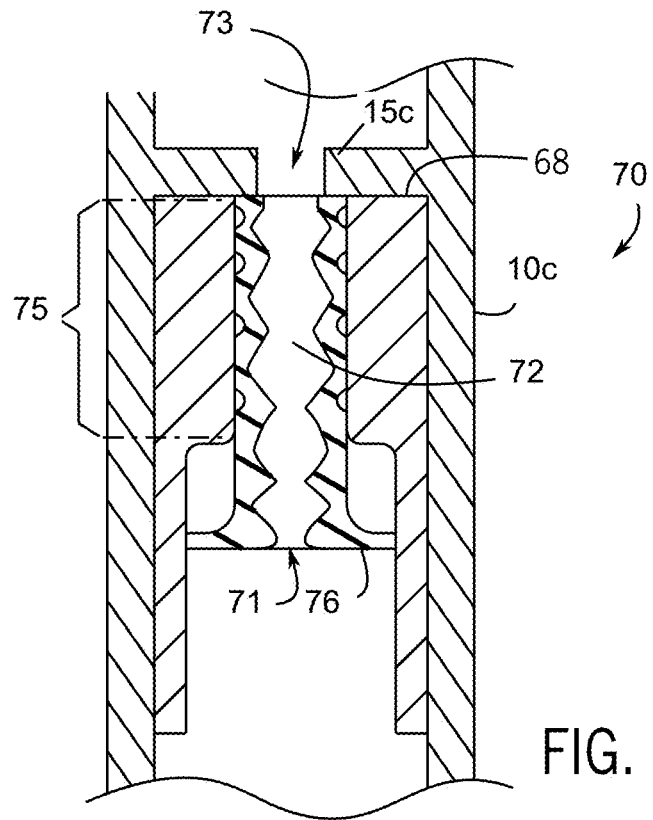
FIG. 7A is a sectional side elevation view of a sixth embodiment of the flow regulator in a pipe in accordance with some embodiments of the invention.
Figure 7B:
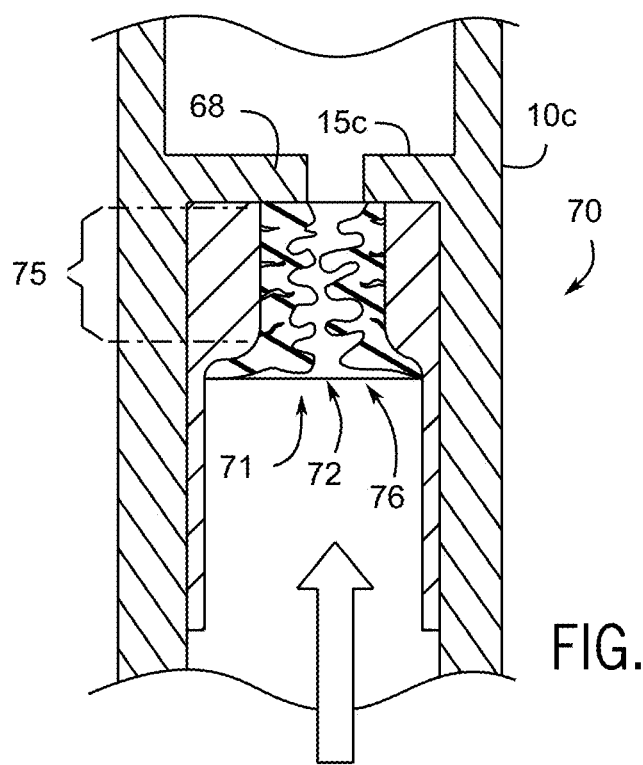
FIG. 7B is a side view corresponding to FIG. 7A under high flow pressure in accordance with some embodiments of the invention.

FIGS. 7A and 7B illustrate another embodiment of the flow regulator 20. FIG. 7A is a sectional side elevation view of flow regulator 70 in a pipe 10c with shank 15c in accordance with some embodiments of the invention. Further, FIG. 7B is a side view corresponding to FIG. 7A under higher fluid flow pressure in accordance with some embodiments of the invention. In some embodiments, the regulator 70 can comprise a cylindrical elastomeric body having wide bottom and top ends 76 and 78, respectively. In some embodiments of the invention, the elastomeric body can include a channel or passageway 72 having a bottom opening 71 and a top opening 73. In some embodiments of the invention, the elastomeric body can comprise a plurality of accordion-like folds 75 along its length.

The illustration of FIG. 7A depicts the flow regulator 70 under little or no fluid flow pressure. Conversely, FIG. 7B shows a regulator 70 at higher fluid flow pressures. As can be seen, in some embodiments of the invention, as the fluid flow pressure on the bottom of regulator 60 is increased (adjacent to inlet 71), the folds 65 can begin to be pushed together, thereby tightening the width of passageway 72, thereby restricting flow therethrough. In some embodiments, the overall result can be to ensure a relatively constant rate of flow at the higher fluid flow pressures.

Figure 8A:
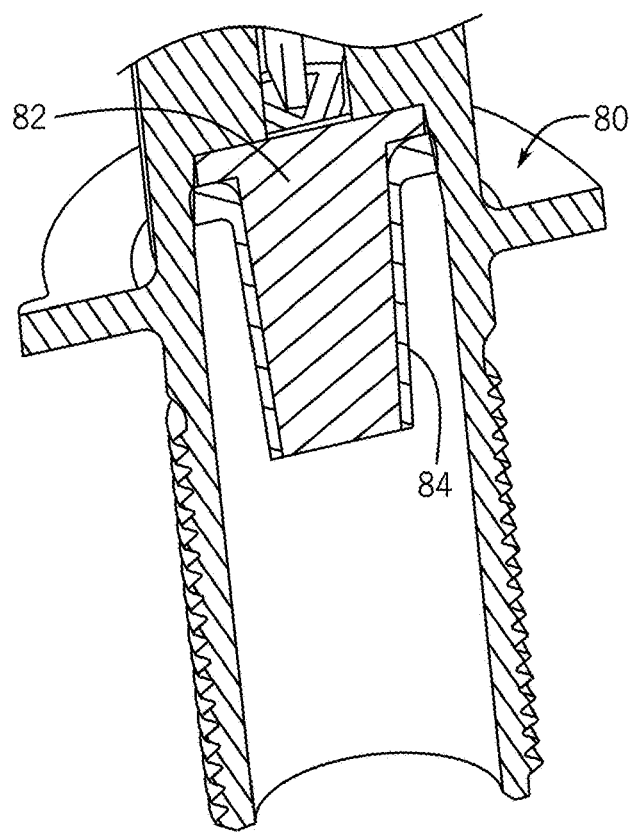
FIG. 8A is a top perspective sectional view of another embodiment of a flow regulator in accordance with some embodiments of the invention.
Figure 8B:
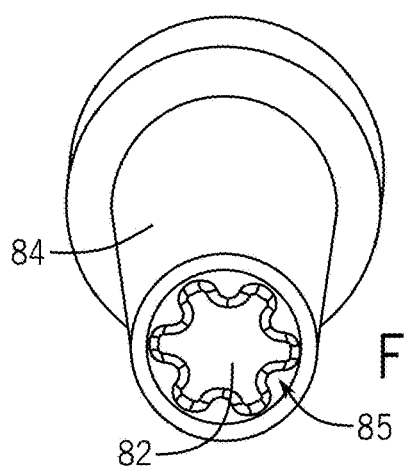
FIG. 8B is a bottom view of the elastomer and insert of FIG. 8A in accordance with some embodiments of the invention.
Figure 8C:
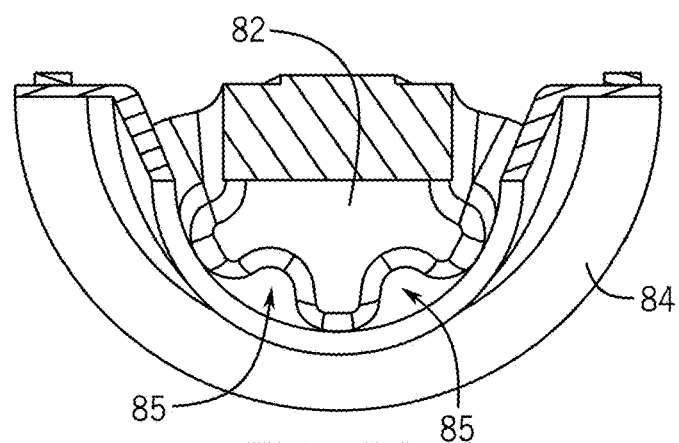
FIG. 8C is a close-up sectional view corresponding to FIG. 8C in accordance with some embodiments of the invention.

FIGS. 8A to 8C show an additional flow regulator 80 comprising an insert 82 surrounded by an elastomeric sleeve 84. In some embodiments, the insert 82 can comprise a polymer, and the elastomeric sleeve 84 can comprise an elastomer 84. In some embodiments, the fluid flow pressure around the outside of sleeve 84 can be equal to the supply fluid flow pressure. However, the fluid flow pressure between inside sleeve 84 (i.e.: in passageways 85 between insert 82 and sleeve 84), will tend to be lower, thereby pushing sleeve 84 into passageways 85, making the flow path through passageways 85 smaller. As a result, in some embodiments, the fluid flow pressure can be regulated because as the fluid flow pressure in the supply increases, the size of passageways 85 can decrease. In some embodiments, insert 82 can be generally star-shaped, as shown.

Figure 9A:
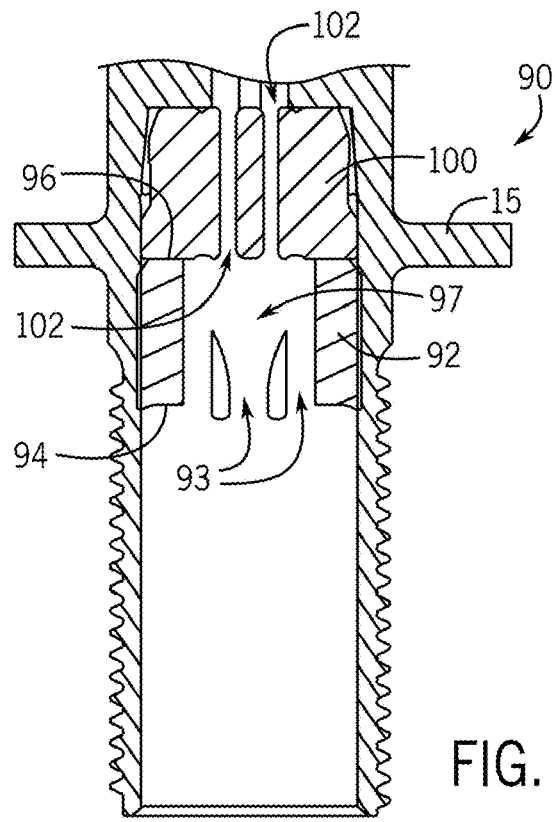
FIG. 9A is a sectional side elevation view of another embodiment of a flow regulator positioned together with a diffuser in accordance with some embodiments of the invention.
Figure 9B:
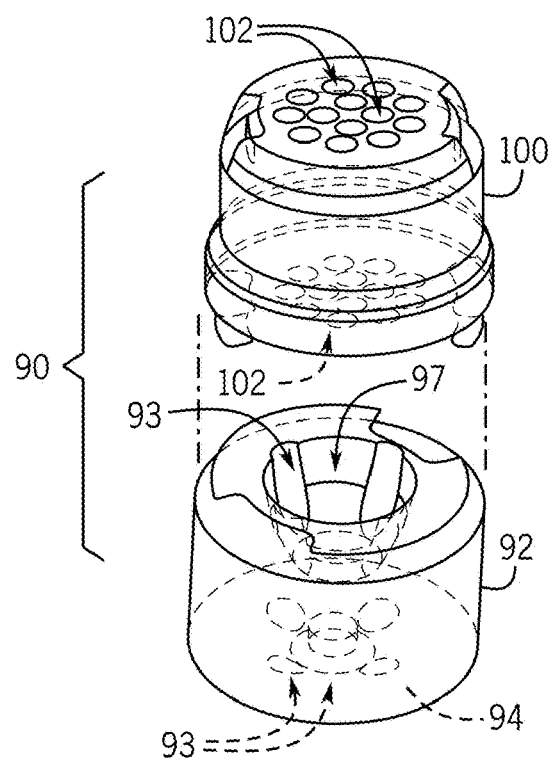
FIG. 9B is a sectional perspective view corresponding to FIG. 7A in accordance with some embodiments of the invention.
Figure 9C:
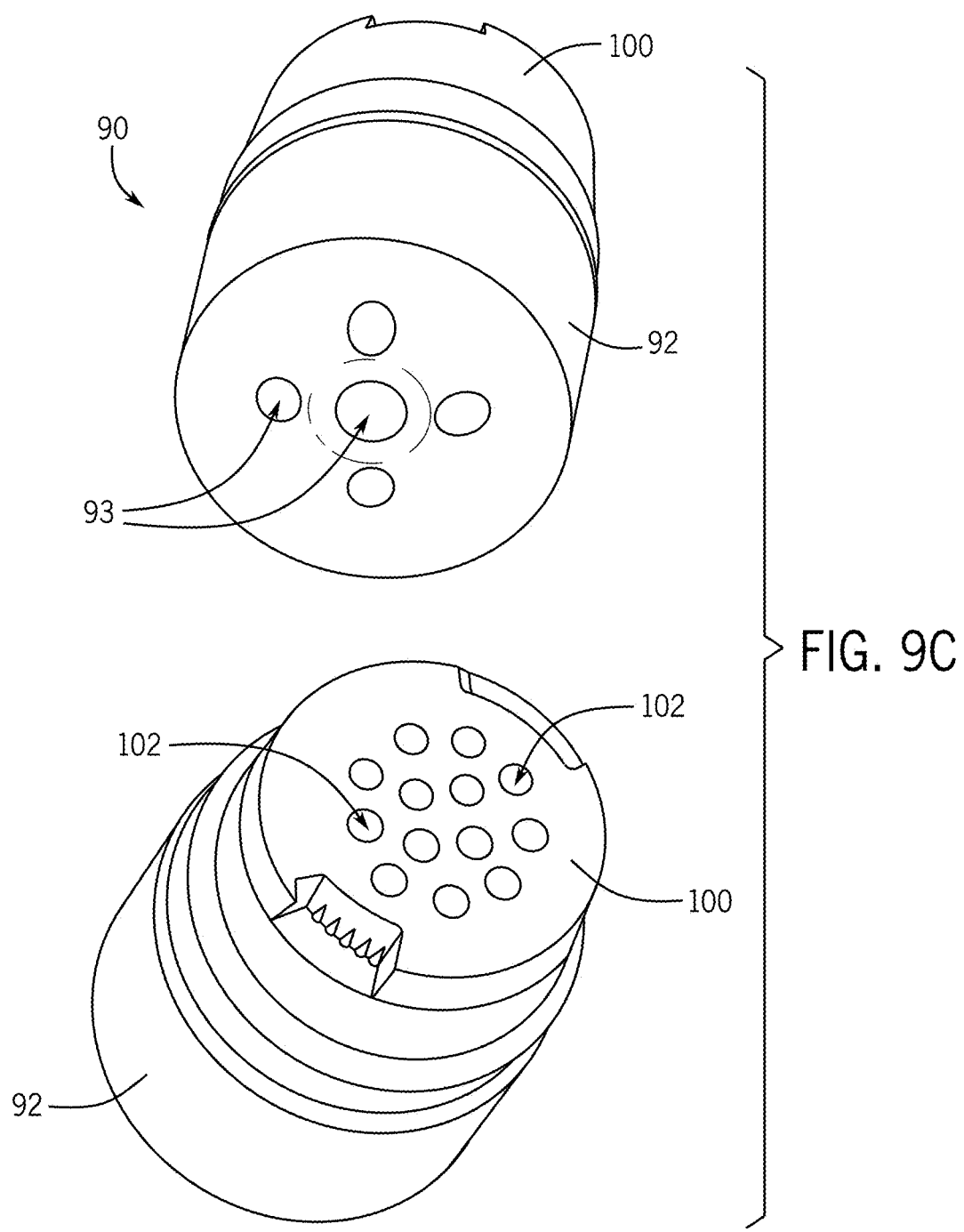
FIG. 9C is shows additional illustrations of the combined flow regulator and diffuser of FIGS. 9A and 9B in accordance with some embodiments of the invention.

FIGS. 9A to 9C show an additional flow regulator 90 comprising a regulator 92 with a diffuser 100 positioned on top. In some embodiments, the regulator 92 can comprise an elastomer. In some embodiments, the regulator 92 can include flow channels 93 passing from a bottom end 94 to a top end 96 of the regulator 92. In some embodiments, the channels 93 can open into a wide flow pocket 97 as shown. In some embodiments of the invention, the diffuser 100 is positioned on top of regulator 92, as shown. In some embodiments, the diffuser 100 can include flow channels 102 passing therethrough. In some embodiments, these flow channels 102 can reduce the fluid flow pressure drop of fluid passing through the system, which in some embodiments, can reduce noise and cavitation. As such, in some embodiments, the regulator system 90 can gradually reduce the velocity of the fluid flow by having a large enough length to diameter ratio to reduce the noise of water passing therethrough. FIG. 9C is shows additional top and bottom perspective views of the combined flow regulator and diffuser of FIGS. 9A and 9B.

Figure 10A:
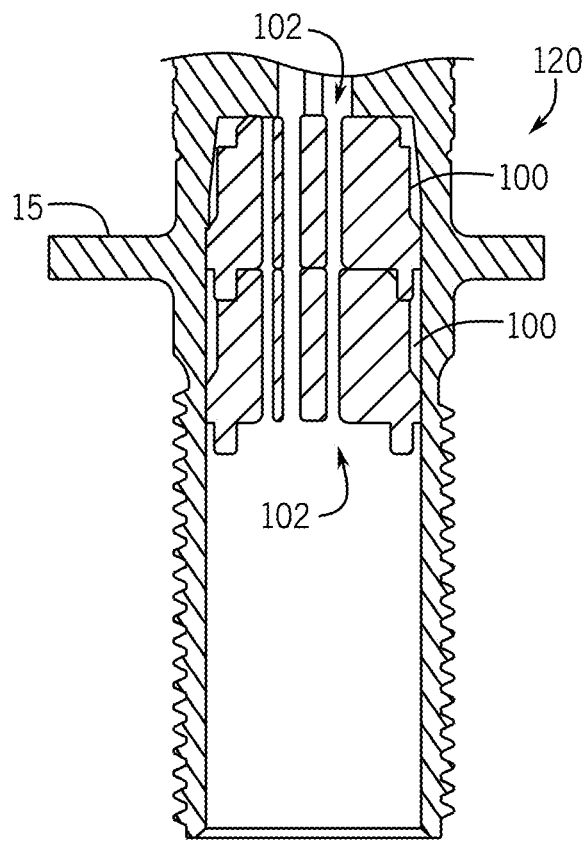
FIG. 10A is a sectional side elevation view of another embodiment of a flow regulation system comprising a pair of diffusers in accordance with some embodiments of the invention.
Figure 10B:
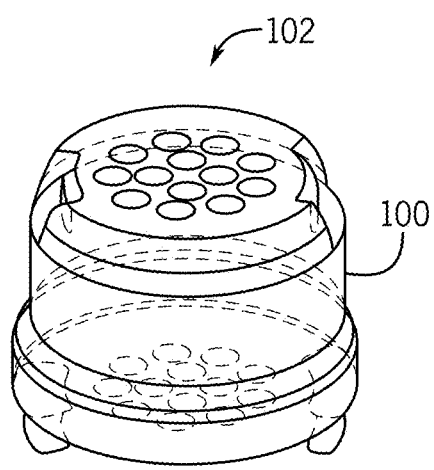
FIG. 10B is a sectional perspective view of one of the diffusers seen in FIG. 10A in accordance with some embodiments of the invention.
Figure 10C:
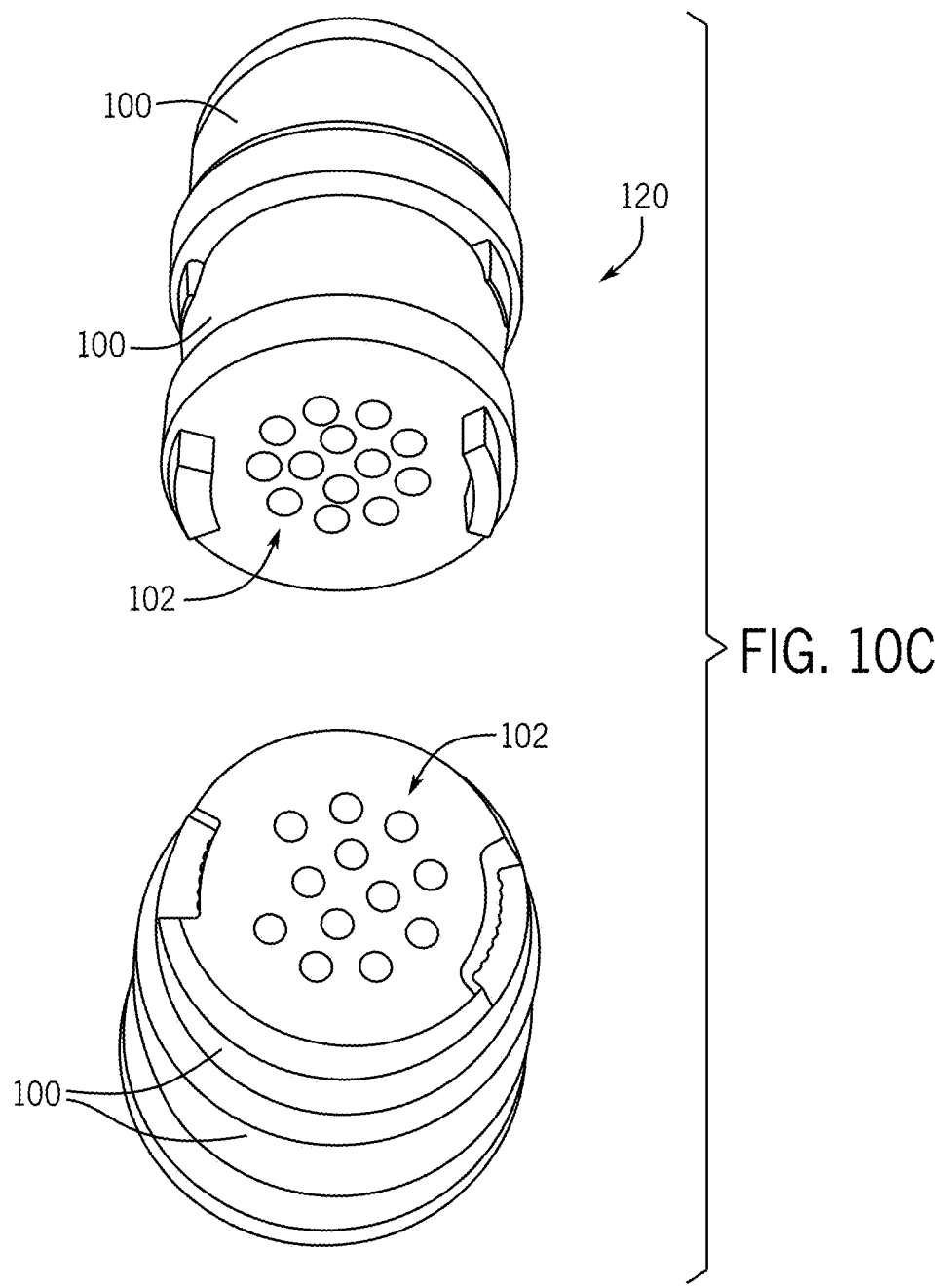
FIG. 10C shows additional illustrations of the stacked pair of diffusers of FIG. 10A in accordance with some embodiments of the invention.

FIGS. 10A to 10C show an additional embodiment of a flow regulation system 120 comprising a pair of diffusers 100 (diffuser 100 shown FIG. 9A to 9C) stacked one on top of another. This embodiment of the flow regulation system operates to reduce water flow noise (by having a sufficiently large length to diameter ratio). FIG. 10C is shows additional illustrations of the stacked pair of diffusers. As shown, in some embodiments, the flow channels 102 can align and extend from one end of one of the diffusers 100 to the opposite end of the other diffuser 100.

Figure 11A:
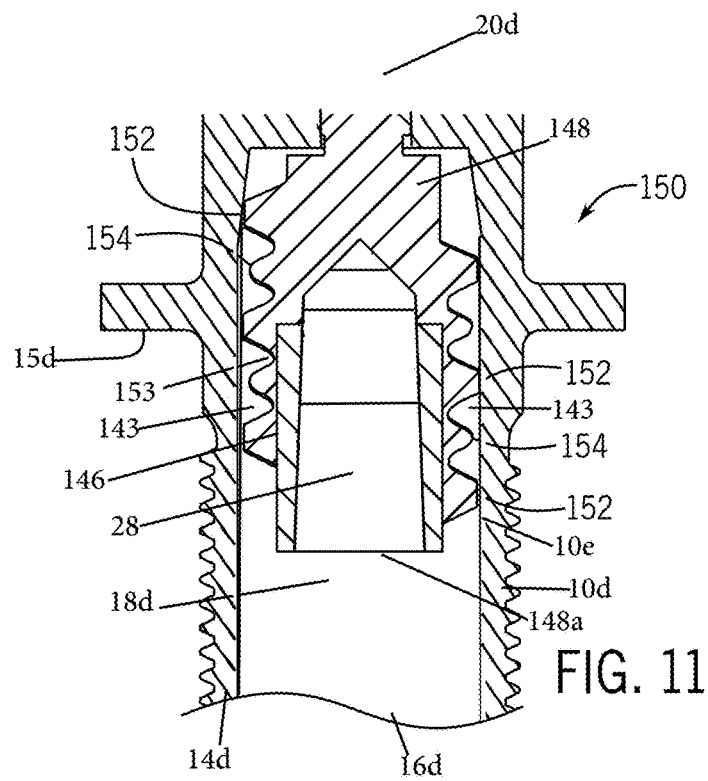
FIG. 11A is a sectional side elevation view of another embodiment of a flow regulator having a pair of spiral projections on its outer surface in accordance with some embodiments of the invention.
Figure 11B:
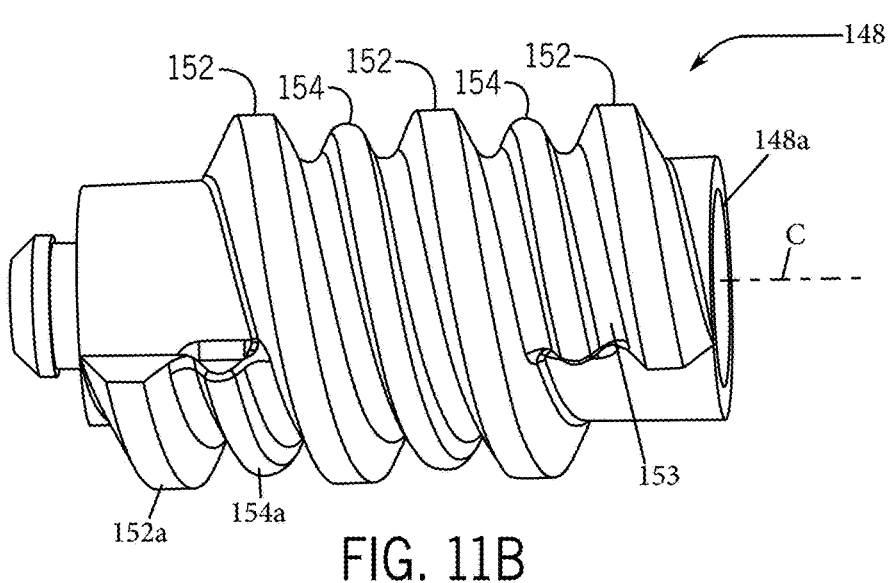
FIG. 11B is a side view of the flow regulator of FIG. 11A in accordance with some embodiments of the invention.

FIGS. 11A-11B show an additional embodiment of a flow regulator assembly 150 with a flow controller 148 positioned in a pipe 10d with shroud 15d. In some embodiments, flow regulator assembly 150 is similar in structure to the conventional regulator found in U.S. patent application Ser. No. 11/594,620, entitled "Plumbing Fill Valve Restrictor And Regulator Apparatus". In some embodiments, the flow controller 148 includes a pair of spiral projections 152 and 154 on an outer surface 153. For example, FIG. 11A is a sectional side elevation view of another embodiment of a flow regulator having a pair of spiral projections on its outer surface in accordance with some embodiments of the invention.

Further, FIG. 11B is a side view of the flow regulator of FIG. 11A in accordance with some embodiments of the invention. In some embodiments, the flow regulator assembly 150 includes a vertical conduit 14d that defines a fluid passageway 16d. In some embodiments, the flow controller 148 is disposed in the fluid passageway 16d, creating a divide in the passageway 16d including an upstream section 18d and a downstream section 20d. In some embodiments, the flow controller 148 may be either slidably or fixedly positioned in the vertical conduit 14d. In some embodiments, where the flow controller 148 is slidably disposed in the vertical conduit 14d, the upstream section 18d and downstream section 20d are defined relative to the position of the flow controller 148. In some embodiments of the invention, the flow regulator assembly 150 includes the additional spiral 154 that travels parallel to spiral 152, and extends a shorter distance outwardly from the outer surface 153. Moreover, in some embodiments, the spiral edge 152a comprises a generally flat surface that is parallel to the outer surface 153 and/or the central axis ("C") of the system 150, and the spiral edge 154a comprises a curved or rounded surface (see FIG. 11B). In some embodiments, the advantage of novel second spiral 154 is that it helps to make the fluid flow laminar as it travels around the outer surface of flow regulator assembly 150, and may reduce noise generated and can significantly improve flow regulation.

Referring to FIG. 11A, in some embodiments, during use, as the pressure of incoming fluid increases, the fluid will not only fill the hollow chamber 28 of the flow controller 148, but also cause the sidewall 146 to expand and, thus, cause portions of the flow controller 148 to more tightly abut the inner conduit surface 10e. In some embodiments, the expansion of the sidewall 146 caused by higher fluid pressure reduces the available flow path space 143 through which the incoming fluid must travel to get past the flow controller 148. For example, in some embodiments, the spiral edge 152a can abut and/or more tightly seal against the sidewall 146, and/or the spiral edge 154a can abut and/or more tightly seal against the sidewall 146. In some embodiments, this reduced space in conjunction with the tortuous pathway around the outer surface 153 between the spirals 152, 154 can result in a capping or a reduction of the flow rate of the incoming fluid to a certain maximum rate. In some embodiments, when the fluid pressure is lowered, the spiral edge 152a can move away from, decouple, or seal less tightly against the sidewall 146, and/or the spiral edge 154a can move away from, decouple, or seal less tightly against the sidewall 146. In some embodiments, this can result in an increase in space between one or more of the spiral edge 152a, 154a, which can result in an increase in flow rate of the incoming fluid with a lower fluid pressure. Thus, in some embodiments, when the flow controller 148 is oriented with its open end 148a facing the upstream passageway section 18d, the flow controller 148 can function as a fluid flow regulator or controller by not only reducing the fluid flow, but also capping the fluid flow rate at a particular maximum when the fluid pressure exceeds a certain trigger point. As examples, and not by way of limitation, the trigger fluid pressure at which the fluid flow controller 148 will begin to cap or regulate flow rate may range from about 20 pounds per square inch (psi) to about 230 psi. As further examples and not by way of limitation, the capped flow rate at such water pressures may be configured at about 3 gallons per minute or greater. In some embodiments, the predetermined trigger fluid pressure may be adjusted by a variety of different ways, such as changing the modulus of elasticity of the composition of the flow controller 148, increasing or decreasing the distance between adjacent spiral edges 152a, 154a of the spirals 152, 154, etc.

The invention claimed is:

1. A flow regulator, comprising:
a main body dimensioned to be received within a flow passageway, the main body including at least one inlet and an outer surface;
an inner volume positioned within the main body and extending from the at least one inlet along at least a partial length of the main body;
a first spiral positioned spiraled around at least a partial length of the main body, the first spiral including a first spiral edge extending a first distance from the outer surface;
a second spiral positioned spiraled around at least a partial length of the main body, the second spiral including a second spiral edge extending a second distance from the outer surface, wherein the first distance is greater than the second distance;
a fluid flow space extending between the first spiral and the second spiral, and between the outer surface and at least the first and second spiral edges, the fluid flow space configured to receive fluid from at least a portion of the flow passageway, wherein the fluid comprises a fluid flow rate and a fluid pressure; and
wherein the fluid flow space is configured and arranged to change based on the fluid pressure.

2. The flow regulator of claim 1, wherein the change is caused by movement of at least the outer surface due to a decrease or increase of the fluid pressure in the inner volume.

3. The flow regulator of claim 1, wherein the inner volume comprises an open-ended cavity comprising the at least one inlet.

4. The flow regulator of claim 1, wherein the main body is cylindrical.

5. The flow regulator of claim 1, wherein the main body comprises an elastomer.

6. The flow regulator of claim 1, wherein at least a portion of the main body is flexible.

7. A flow regulator, comprising:
a main body dimensioned to be received within a flow passageway, the main body including at least one inlet and an outer surface;
an inner volume positioned within the main body and extending from the at least one inlet along at least a partial length of the main body;
a first spiral positioned spiraled around at least a partial length of the main body, the first spiral including a first spiral edge extending a first distance from the outer surface;
a second spiral positioned spiraled around at least a partial length of the main body, the second spiral including a second spiral edge extending a second distance from the outer surface, wherein the first distance is greater than the second distance;
a fluid flow space extending between the first spiral and the second spiral, and between the outer surface and at least the first and second spiral edges, the fluid flow space configured to receive fluid from at least a portion of the flow passageway, wherein the fluid comprises a fluid flow rate and a fluid pressure;
wherein the main body is configured to be slidably or fixedly positioned in the flow passageway;
wherein main body is configured to adjust the fluid flow rate in the downstream section based at least in part on the fluid pressure; and
wherein the fluid flow rate adjustment comprises a decrease in flow rate in the downstream section based at least in part on an increase in the flow pressure in the upstream section, wherein an increase in flow pressure in the inner volume produces movement of at least the outer surface.

8. The flow regulator of claim 7, wherein a positioning of the flow regulator in a flow passageway creates a divide in the flow passageway comprising an upstream section adjacent the at least one inlet, and a downstream section adjacent the opposite end of the main body.

9. The flow regulator of claim 7, wherein the fluid flow rate adjustment comprises a decrease in flow rate in the downstream section based on an increase in the flow pressure in the upstream section, wherein an increase in flow pressure in the inner volume produces movement of at least one of the first spiral edges and the second spiral edges outward from a central axis of the main body.

10. A flow controller, comprising:
an insert including at least one inlet of a pocket, the pocket extending at least a partial length of the insert and defining an adjustable inner volume;
a first spiral extending around at least a partial length of the insert, the first spiral extending from an outer surface of the insert to a first spiral edge; and
a second spiral extending around at least a partial length of the insert parallel to the first spiral, the second spiral extending from the outer surface of the insert to a second spiral edge, the distance between the outer surface and the second spiral edge being less than the distance between the outer edge and the first spiral edge; and
wherein said first spiral and second spiral both wrap at least in part around the inner volume.

11. The flow controller of claim 10, wherein the insert comprises an adjustable fluid flow space extending between the first spiral and the second spiral, and between the outer surface and at least the first and second spiral edges when positioned in a flow passageway.

12. The flow controller of claim 11, wherein the insert is configured so that the size of the inner volume is based on an exerted fluid pressure in the pocket.

13. The flow controller of claim 12, wherein an increase in the fluid pressure produces an increase in the size of the inner volume and a decrease in the fluid flow space.

14. The flow controller of claim 12, wherein an increase in the fluid pressure in the pocket produces a movement of at least one of the first spiral edges and the second spiral edges outward from the pocket.

15. The flow controller of claim 10, wherein the first spiral edges are parallel with a central axis of the insert.

16. The flow controller of claim 10, wherein the second spiral edges comprise a curve surface.

17. The flow controller of claim 10, wherein the insert comprises a flexible elastomer.

18. A flow regulator, comprising:
a main body dimensioned to be received within a flow passageway, the main body including at least one inlet and an outer surface;
an inner volume positioned within the main body and extending from the at least one inlet along at least a partial length of the main body;
a first spiral positioned spiraled around at least a partial length of the main body, the first spiral including a first spiral edge extending a first distance from the outer surface;

a second spiral positioned spiraled around at least a partial length of the main body, the second spiral including a second spiral edge extending a second distance from the outer surface, wherein the first distance is greater than the second distance;

a fluid flow space extending between the first spiral and the second spiral, and between the outer surface and at least the first and second spiral edges, the fluid flow space configured to receive fluid from at least a portion of the flow passageway, wherein the fluid comprises a fluid flow rate and a fluid pressure; and wherein said inner volume is configured and arranged to change based on the fluid pressure.

19. The flow regulator of claim 18, wherein said first spiral and second spiral both wrap at least in part around the inner volume.

20. The flow regulator of claim 18, wherein the fluid flow space is configured and arranged to change based on the fluid pressure.

* * * * *